(12) United States Patent
Min et al.

(10) Patent No.: US 11,212,777 B2
(45) Date of Patent: Dec. 28, 2021

(54) DYNAMIC RESOURCE UNIT ALLOCATION FOR WIRELESS LOCAL-AREA NETWORKS (WLANS)

(71) Applicant: Intel Corporation, Santa Clara, CA (US)

(72) Inventors: Alexander W. Min, Portland, OR (US); Rath Vannithamby, Portland, OR (US); Yanjie Pan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 16/728,775

(22) Filed: Dec. 27, 2019

(65) Prior Publication Data

US 2020/0137727 A1     Apr. 30, 2020

(51) Int. Cl.
*H04W 72/04* (2009.01)

(52) U.S. Cl.
CPC ....... *H04W 72/04* (2013.01); *H04W 72/0413* (2013.01); *H04W 72/0453* (2013.01)

(58) Field of Classification Search
CPC .............. H04W 72/04; H04W 72/0413; H04W 72/0453
See application file for complete search history.

(56) References Cited

U.S. PATENT DOCUMENTS

| | | | |
|---|---|---|---|
| 10,904,920 B1* | 1/2021 | Noh ....................... | H04W 76/15 |
| 2018/0199215 A1* | 7/2018 | Patil ...................... | H04L 1/0003 |
| 2018/0368118 A1* | 12/2018 | Hsu ...................... | H04W 72/042 |
| 2019/0306837 A1* | 10/2019 | Choi ..................... | H04W 76/10 |
| 2019/0356410 A1* | 11/2019 | Alpert .................. | H04L 1/0003 |
| 2020/0137727 A1* | 4/2020 | Min ...................... | H04W 72/04 |

* cited by examiner

*Primary Examiner* — Raj Jain
(74) *Attorney, Agent, or Firm* — Schwegman Lundberg & Woessner, P.A.

(57) ABSTRACT

Methods, apparatuses, and computer readable media for dynamic resource unit allocation for wireless local-area networks (WLANs) include an apparatus of an access point (AP) including processing circuitry configured to determine a group of stations (STAs) and first RUs for uplink (UL) multi-user (MU) orthogonal frequency division multiple-access (OFDMA) transmissions. The processing circuitry is further configured to transmit a trigger frame (TF) including indications of the determined first RUs for the group of STAs to transmit trigger-based (TB) physical layer (PHY) protocol data unit (PPDUs) (TB PPDUs) in response to the TF. The processing circuitry may be further configured to in response to a STA not responding to the TF, determine the STA as being inactive, and reallocate to active STAs RUs of inactive STAs, and transmit a second TF to the group of STAs that are active.

20 Claims, 21 Drawing Sheets

| LINE | CODE |
|---|---|
| 1 | deleteNonresponsingSTAinfoFromList(); |
| 2 | updateRuUsedFlags(); |
| 3 | do { |
| 4 |    tempList = aliveStaInfoList; |
| 5 |    for (n=1; n<N; n++) { |
| 6 |       if (ru_used_flag[n] ==0) { |
| 7 |          t= (n<=M)? (n+1): (n-1); |
| 8 |          status=findInListForStaWhoOccupiesRu(t,i); |
| 9 |          cnt=1; |
| 10 |          while (1<=t<=N && cnt<=2) { |
| 11 |             if (status==FOUND) { |
| 12 |                // Re-allocate RU_n to the STA that occupies RU_T |
| 13 |                start=tempList[i].ru_index_start; |
| 14 |                end=tempList[i].ru_index_end; |
| 15 |                tempLIst[i].ru_index_start=Min(start,t); |
| 16 |                tempLIst[i].ru_index_end=max(end,t); |
| 17 |                ru_used_flag[n]=1; |
| 18 |                break; |
| 19 |             } |
| 20 |             else { |
| 21 |                //Try the other side |
| 22 |                t=2*n-1; |
| 23 |                status = findInListForStaWhoOccupiesRu(t,i); |
| 24 |                cnt++; |
| 25 |             } |
| 26 |          } |
| 27 |       } |
| 28 |    } |
| 29 |    aliveStainfoList = tempList; |
| 30 | } while(getOccupiedRuNum() < N) |
| 31 | assignMaxSupportedRuSizeToAliveStas(); |

FIG. 12

DYNAMIC RESOURCE UNIT ALLOCATION FOR WIRELESS LOCAL-AREA NETWORKS (WLANS)

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to dynamic resource unit (RU) allocation for wireless local-area network (WLANs).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 12 illustrates a method of dynamic allocation of RUs, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
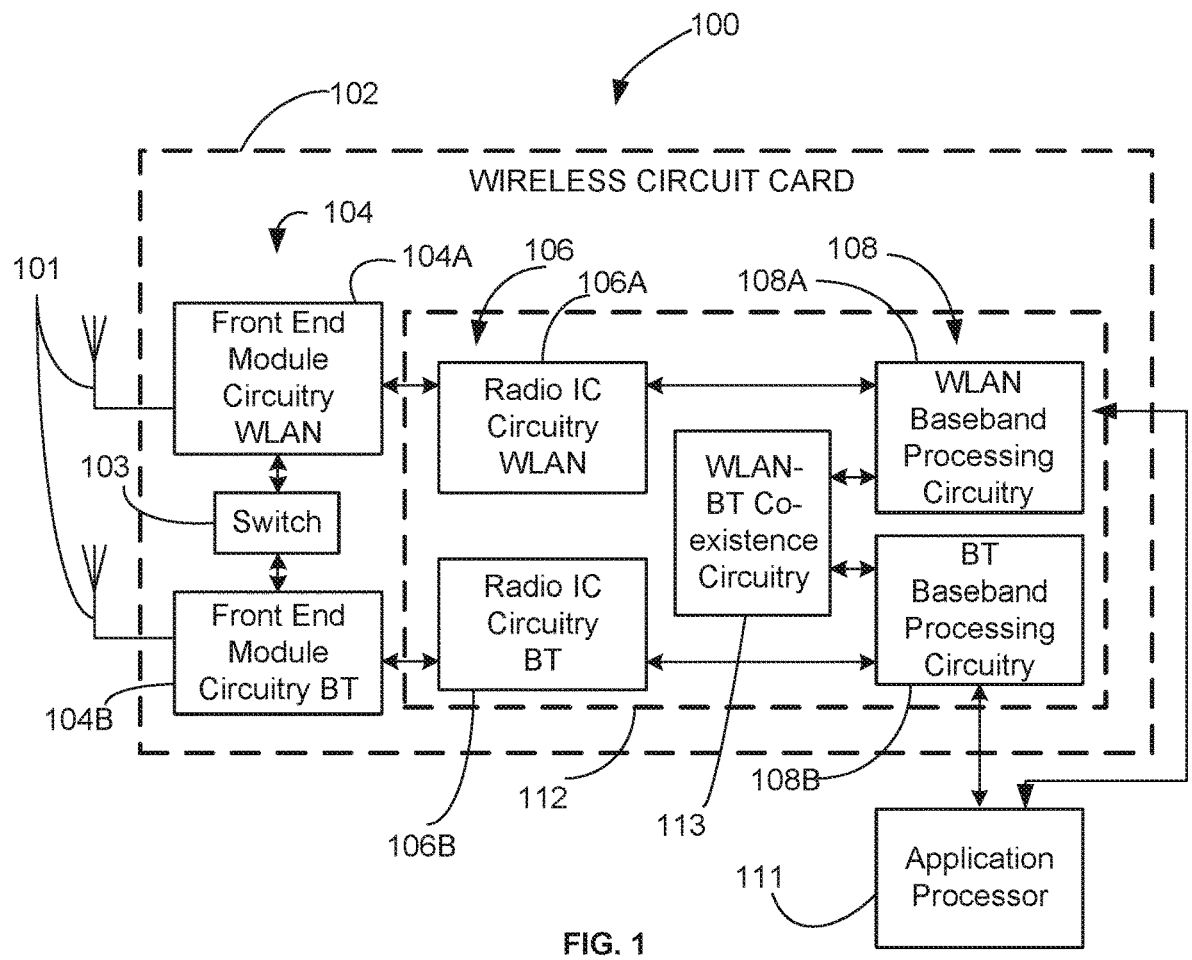
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 1049. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WI AN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
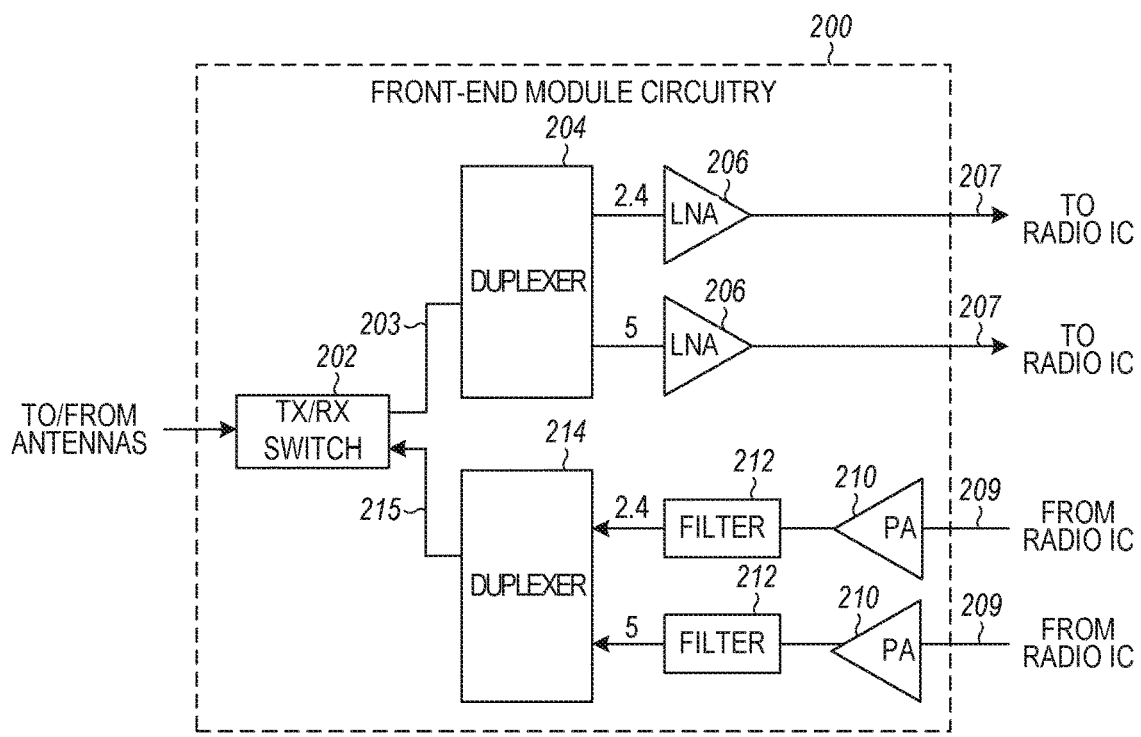
FIG. 2 illustrates FEM circuitry in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
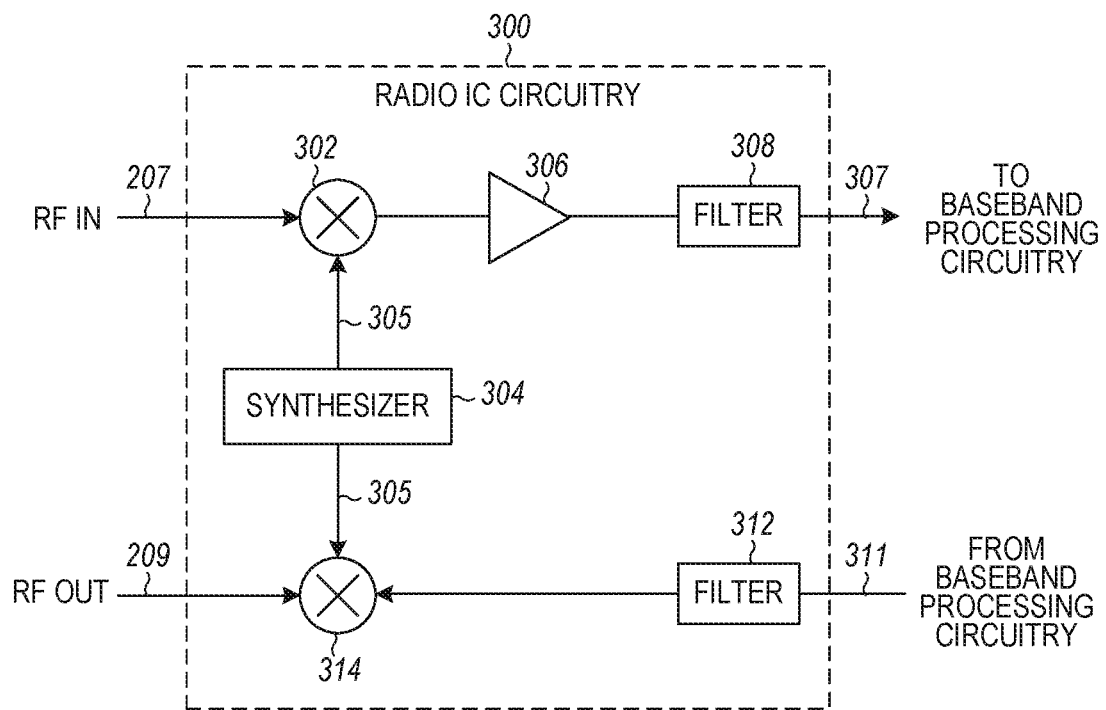
FIG. 3 illustrates radio integrated circuit (IC) circuitry in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
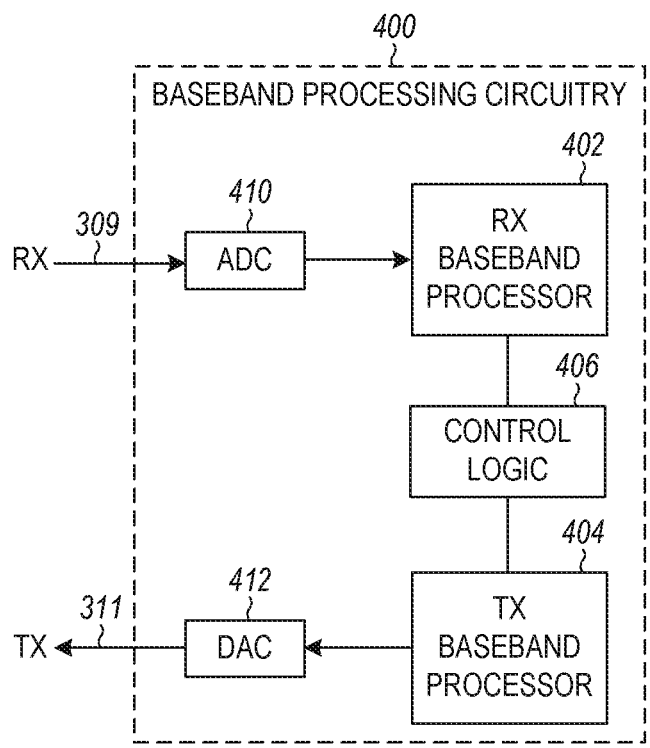
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
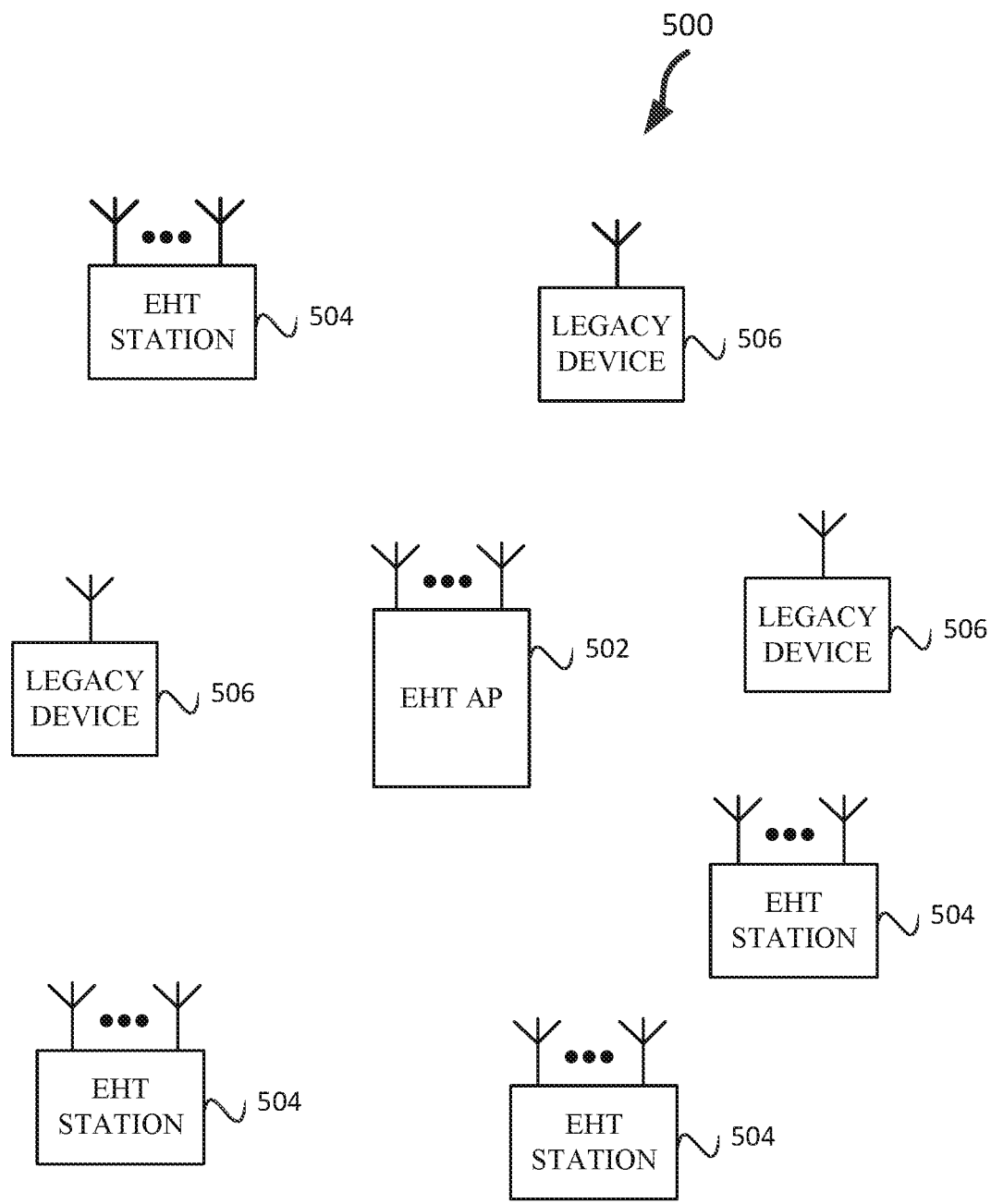
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of EHT (e.g., IEEE 802.11ax/be) stations (STAs) 504, and a plurality of legacy (e.g., IEEE 802.11g/n/ac) devices 506. In some embodiments, the EHT STAs 504 and/or EHT AP 502 are configured to operate in accordance with IEEE 802.11 extremely high throughput (EHT). In some embodiments, the EHT STAs 504 and/or HE AP 520 are configured to operate in accordance with IEEE 802.11az. In some embodiments, IEEE 802.11EHT may be termed Next Generation 802.11. In some embodiments, the EHT AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 506 may not be able to decode the beacon frames and thus are not able to operate in an ER BSS. The BSSs, e.g., BSS, ER BSS, and HE BSS, may used different BSSIDs.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. EHT AP 502 may be connected to the internet. The EHT AP 502 and/or EHT STA 504 may be configured for one or more of the following: 320 MHz bandwidth, 16 spatial streams, multi-band or multi-stream operation (e.g., as disclosed in conjunction with FIG. 8), and 4096 QAM.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the EHT AP 502 and EHT STAs 504 are configured to operate in accordance with IEEE 802.11EHT, the legacy devices 506 may include devices that are configured to operate in accordance with IEEE 802.11ax. The EHT STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with EHT STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g. IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit an EHT/HE trigger frame transmission, which may include a schedule for simultaneous UL transmissions from EHT STAs 504. The EHT AP 502 may transmit a time duration of the TXOP and sub-channel information. During the TXOP, EHT STAs 504 may communicate with the EHT AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the EHT AP 502 may communicate with EHT stations 504 using one or more HE or EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE 802.11 communication techniques. In some embodiments, the EHT AP 502 may also be configurable to communicate with EHT stations 504 outside the HE TXOP in accordance with legacy IEEE 802.11 or IEEE 802.11EHT/ax communication techniques, although this is not a requirement.

In some embodiments the EHT station 504 may be a "group owner" (GO) for peer-to-peer modes of operation. A wireless device may be a HE station 502 or a EHT AP 502. In some embodiments, the EHT STA 504 and/or EHT AP 502 may be configured to operate in accordance with IEEE 802.11mc. In example embodiments, the radio architecture of FIG. 1 is configured to implement the EHT STA 504 and/or the EHT AP 502. In example embodiments, the front-end module circuitry of FIG. 2 is configured to implement the EHT STA 504 and/or the EHT AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-16.

In example embodiments, the EHT station 504 and/or the EHT AP 502 are configured to perform the methods and operations/functions described herein in conjunction with FIGS. 1-16. In example embodiments, an apparatus of the EHT station 504 and/or an apparatus of the EHT AP 502 are configured to perform the methods and functions described herein in conjunction with FIGS. 1-16. The term Wi-Fi may refer to one or more of the IEEE 802.11 communication standards. AP and STA may refer to EHT/HE AP 502 and/or EHT/HE station 504 as well as legacy devices 506.

In some embodiments, a HE AP STA may refer to a EHT AP 502 and/or a EHT STAs 504 that is operating as a HE APs 502. In some embodiments, when a EHT STA 504 is not operating as a HE AP, it may be referred to as a HE non-AP STA or HE non-AP. In some embodiments, EHT STA 504 may be referred to as either a HE AP STA or a HE non-AP. EHT may refer to a next generation IEEE 802.11 communication protocol, which may be IEEE 802.11be or may be designated another name.

Figure 6:
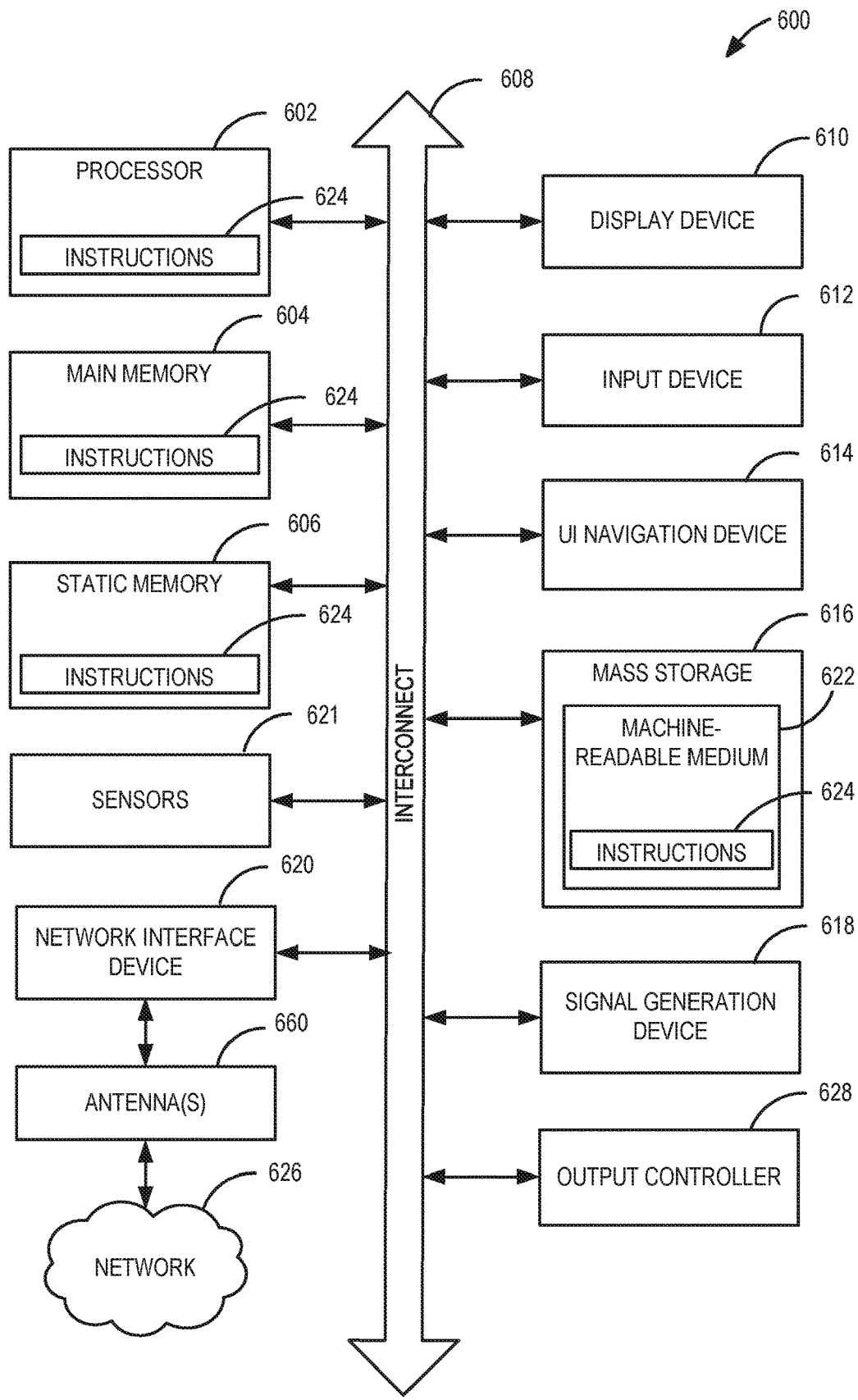
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
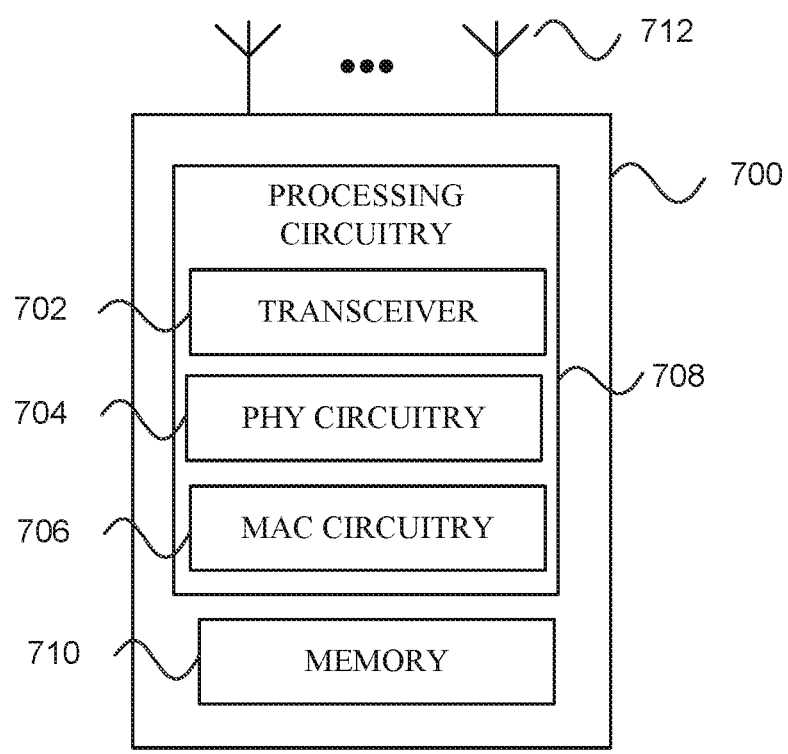
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PRY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
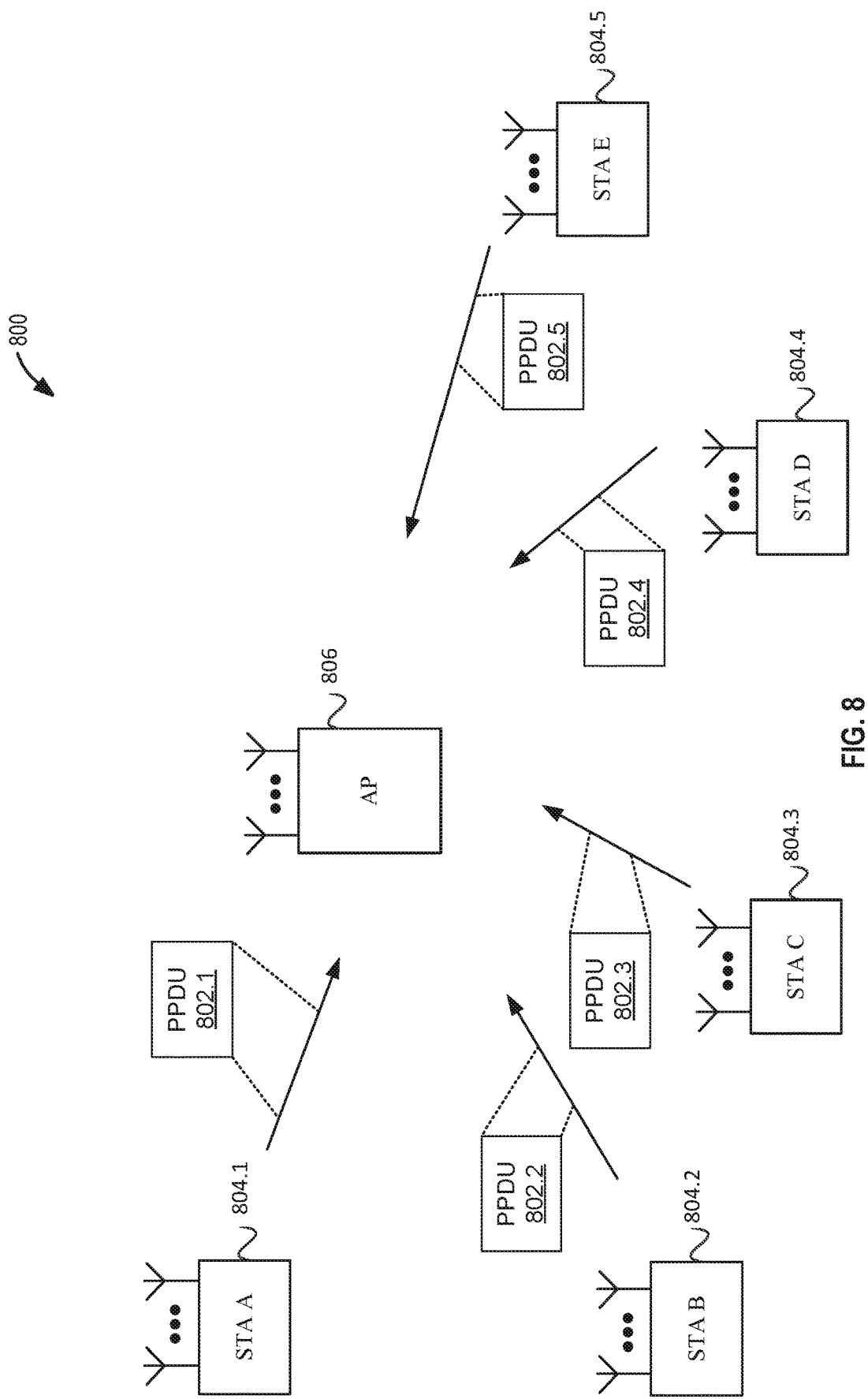
FIG. 8 illustrates trigger-based (TB) multi-user (MU) uplink (UL) orthogonal frequency division multiple access (OFDMA) transmission, in accordance with some embodiments.

FIG. 8 illustrates trigger-based (TB) multi-user (MU) uplink (UL) orthogonal frequency division multiple access (OFDMA) transmission 800, in accordance with some embodiments. Illustrated in FIG. 8 STA A 804.1, STA B 804.2, STA C 804.3, STA D 804.4, STA E 804.5, PPDU 802.1 through PPDU 802.5, and AP 806. STAs 804 is the same or similar as EHT STAs 504, e.g., EHT STAs or HE STAs. AP 806 is the same or similar as EHT AP 502, e.g., EHT AP or HE AP. Physical layer (PHY) protocol data unit (PPDUs) 802 may be TB PPDUs. The PPDU 802 are encoded on subchannels in accordance with a trigger frame (e.g., transmitted before the PPDUs 802), in accordance with some embodiments. The TB MU UL OFDMA transmission 800 may be in accordance with IEEE 802.11, e.g., IEEE 802.11ax or IEEE 802.11be. The PPDUs 802 may be transmitted on multiple spatial streams, e.g., as indicated in NSS 1214.

Figure 9:
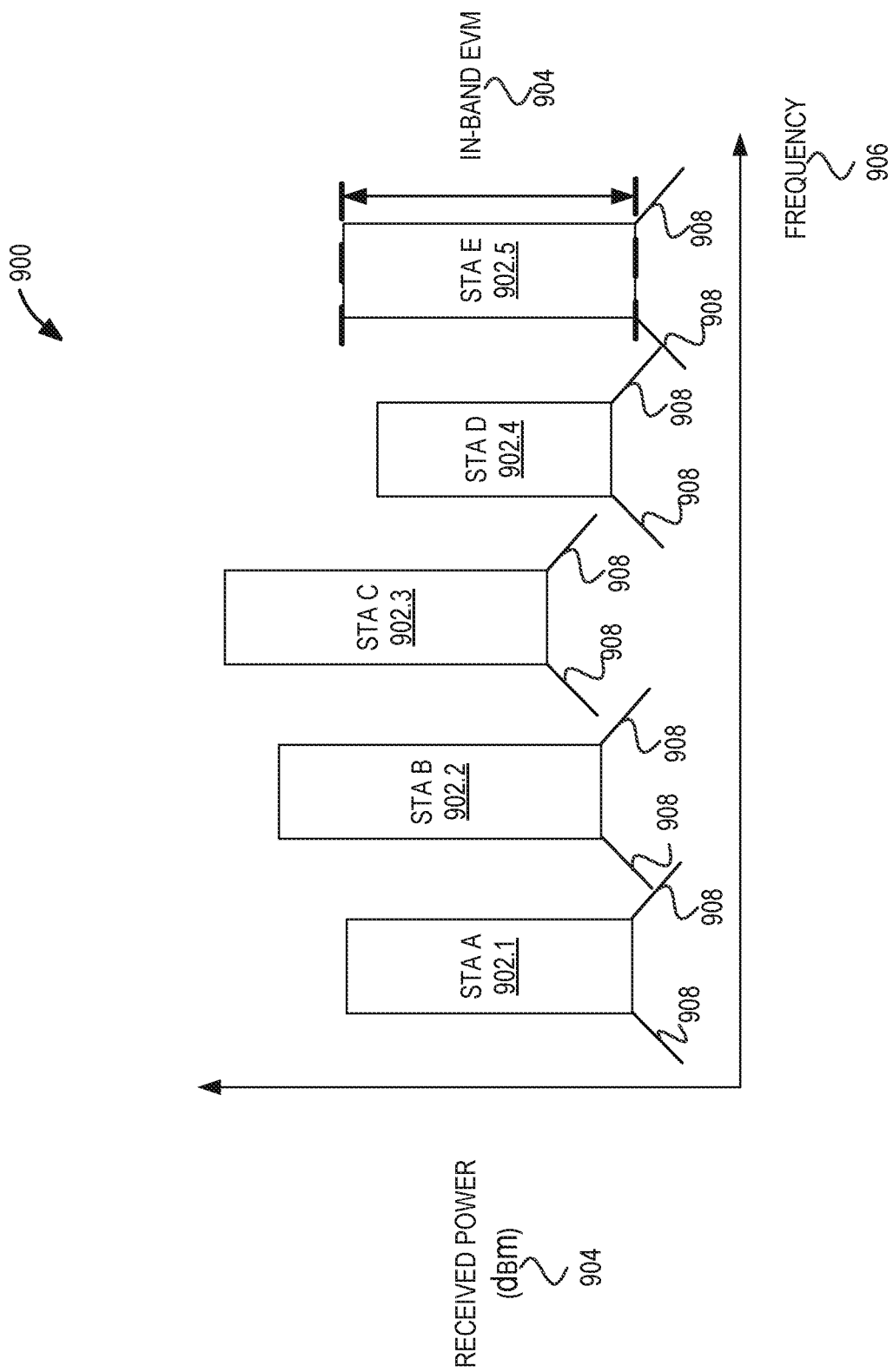
FIG. 9 illustrates error vector magnitude (EVM) for TB PPDUs, in accordance with some embodiments.

FIG. 9 illustrates error vector magnitude (EVM) for TB PPDUs 900, in accordance with some embodiments. FIGS. 8 and 9 are disclosed in conjunction with one another. Illustrated in FIG. 9 is frequency 906 along a horizontal axis, received power (dBm) 904 along a vertical axis, in-band EVM 904, STA A 902.1, STA B 902.2, STA C 902.3, STA D 902.4, STA E 902.5, and out-of-band EVM 908. The EVM for TB PPDUs 900 may be from the PPDUs 802 illustrated in FIG. 8 where the STAs 902 indicate the received power 904 at the AP 806, the in-band. EVM 904 at the AP 806, and the out-of-band EVM 908 at the AP 806. The frequency 906 separation indicates the RUs 1202 that the PPDUs 802 are transmitted on simultaneously to the AP 806, in accordance with the RU 1202 assigned to each of the STAs 902 by a trigger frame 1100.

Reception is improved when the AP 806 allocates the RUs among the STAs 902 in such a way that the amount of potential MU interference (MUI), e.g., inter STA, is minimized or reduced.

Figure 10:
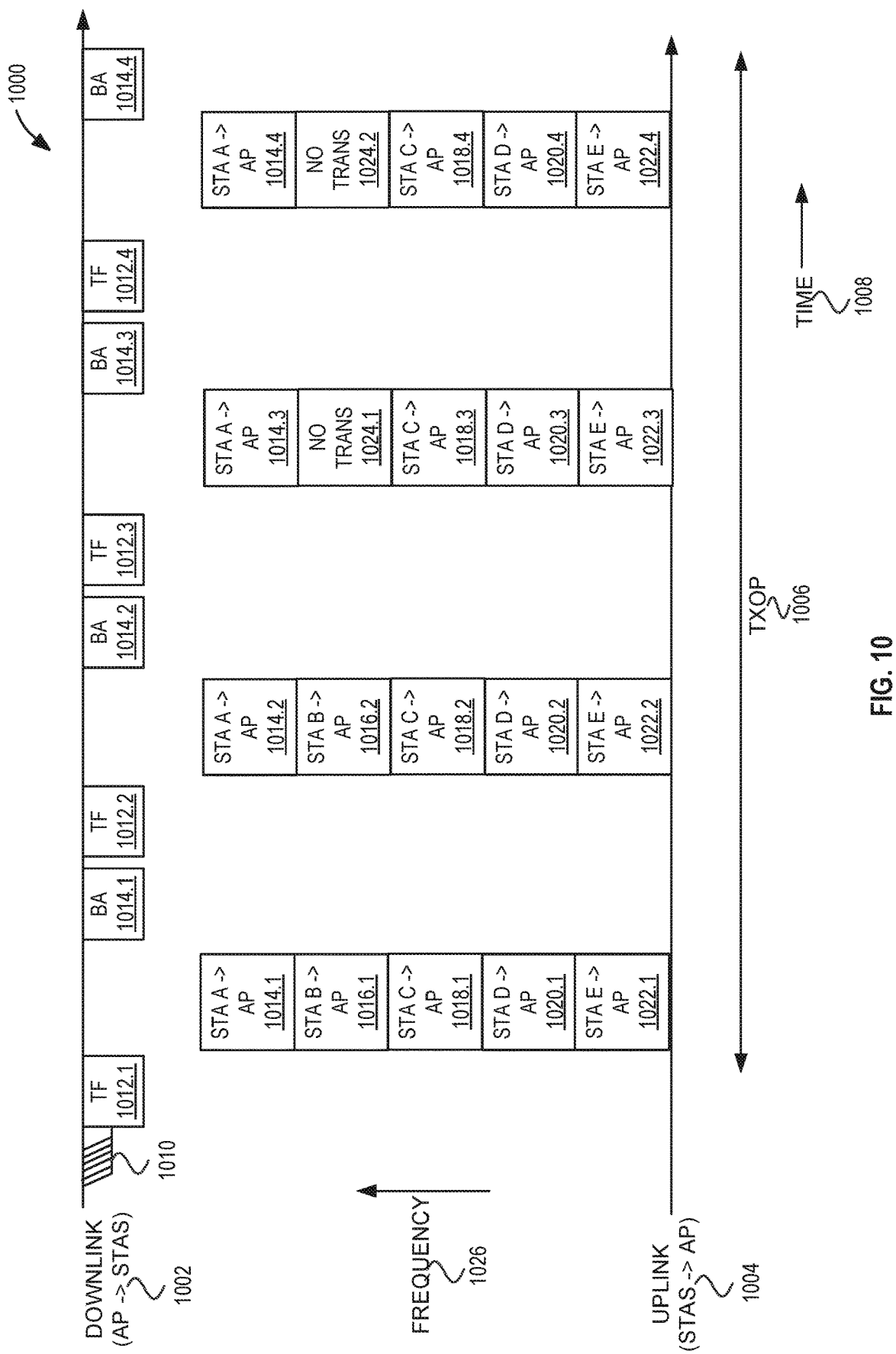
FIG. 10 illustrates a TB MU UL OFDMA transmission, in accordance with some embodiments.

FIG. 10 illustrates a TB MU UL OFDMA transmission 1000, in accordance with some embodiments. Illustrated in FIG. 10 is downlink (DL) AP→STAs 1002, uplink (UL) STAs→AP 1004, TXOP 1006, time 1008, channel acquisition 1010, TF 1012, block acknowledgement (BA) 1014, STA A→AP 1014, STA B→AP 1016, STA C→AP 1018, STA D→AP 1020, STA E→AP 1022, no transmission (TRANS) 1024, and frequency 1026. Time 1008 indicates the progression of time along a horizontal axis. Frequency 1026 indicates frequency along a vertical axis. DL 1002 indicates that the transmission are from the AP to the STAs. The AP may be the same or similar as AP 806. The STAs 1014, 1016, 1018, 1020, 1022 are TB PPDUs. The STA A, B, C, D, and E may be the same or similar as STAs 804. Trigger frames (TFs) 1012 may be the same or similar as TF 1100. TFs 1012 indicates OFDMA RUs (a portion of the frequency) for the STAs to transmit TB PPDUs to the AP. No trans 1024 indicates that STA B did not transmit a TB PPDU in response to TF 1012.3 and TF 1012.4.

BAs 1014 acknowledge the receipt of the TB PPDUs (e.g., BA 1014.1 is transmitted by the AP to acknowledge receipt of STA A→AP 1014.1, STA B→AP 1016.1, STA C→AP 1018.1, STA D→AP 1020.1, and STA E→AP 1022.1 by the AP). EVM for TB PPDUs 900 may illustrate the properties of the TB PPDUs received by the AP in response to the TF 1012.1 and/or TF 1012.2. FIG. 8 may illustrate the STAs transmitted in the TB PPDU on OFDMA RUs in response to a TF 1012. The transmission opportunity (TXOP) 1006 indicates that AP performed channel acquisition 1010 and acquired the channel (e.g., the channel that occupies frequency 1026 that is used for the UL transmissions STA A, B, C, D, E→AP 1014, 1016, 1018, 1020, 1022, respectively, and DL transmission, e.g., TF 1012 and BA 1014). The duration of the TXOP is indicated 1006 by length and/or duration fields of the TFs 1012, BA 1014, and TB PPDUs.

The AP scheduled STAs A, B, C, D, and E, and encoded TFs 1012.3, 1012.4 and transmitted TFs 1012.3, 1012.4 to the STAs, but STA B did not respond as indicated by no trans 1024.1, 1024.2. In some embodiments, STA B may have indicated that it no longer supports TB HE/EHT PPDU transmissions, e.g., via a operating mode indication, which may be part of an element.) The AP needs to dynamically re-allocate the RU (frequency 1026 range) that was allocated to STA B to another UL group member to reduce or minimize waste of spectrum resources and to increase or maximize overall throughput and packet error rate (PER) performance of the UL group, e.g., the UL group in this case is STA A, STA B, STA C, STA D, and STA E. Since STA B is not responding or has indicated that it no longer supports UL TB PPDU, the AP needs to re-allocate the RU allocated for STA B to another member of the group, e.g., STA A, STA C, STA D, or STA E.) The TB PPDUs transmitted in accordance with OFDMA may also be transmitted on one or more spatial streams as indicated by NSS 1214) in accordance with MU-multiple-input multiple-output (MIMO) (MU-MIMO).

Although only STA B did not respond in FIG. 10, in some embodiments other STAs may not respond so that there may be more than one RU to reallocation. In some embodiments, the AP performs the method 1200, 2300, 2400, and/or the methods disclosed herein, to dynamically re-allocate RU from STAs that are not responding to other STAs of the group. Some embodiments minimize or reduce the amount of multi-user interference (MUI) in the TB HE/EHT PPDU reception and maximize or increase the throughput performance.

To avoid spectrum waste an AP may schedule UL reporting from the STAs (e.g., buffer status report, bandwidth query report, null data packet feedback report poll, etc.). However when the AP schedules UL reporting from the STAs in response to one or more STAs not responding to a TF, there is overhead.

In some embodiments, an IEEE 802.11ax/EHT AP dynamically re-allocates unoccupied RU(s) (e.g., RU that STA B did not use) to other STAs STA A, C, D, or E) within the solicited UL group (STAs A, B, C, D, E) so as to increase or maximize throughput performance and reduce or minimize potential waste of wireless spectrum (e.g., RU resources). APs dynamic RU-allocation policy has affects multi-user interference (MUI) experienced in the reception of TB UL PPDUs at the AP (e.g., as illustrated in FIG. 9). In some embodiments, the AP performs a method of dynamic RU re-allocation that reduces or minimizes the amount of MUI in the TB HE PPDU transmissions and increases or maximizes the throughput performance.

Figure 11:
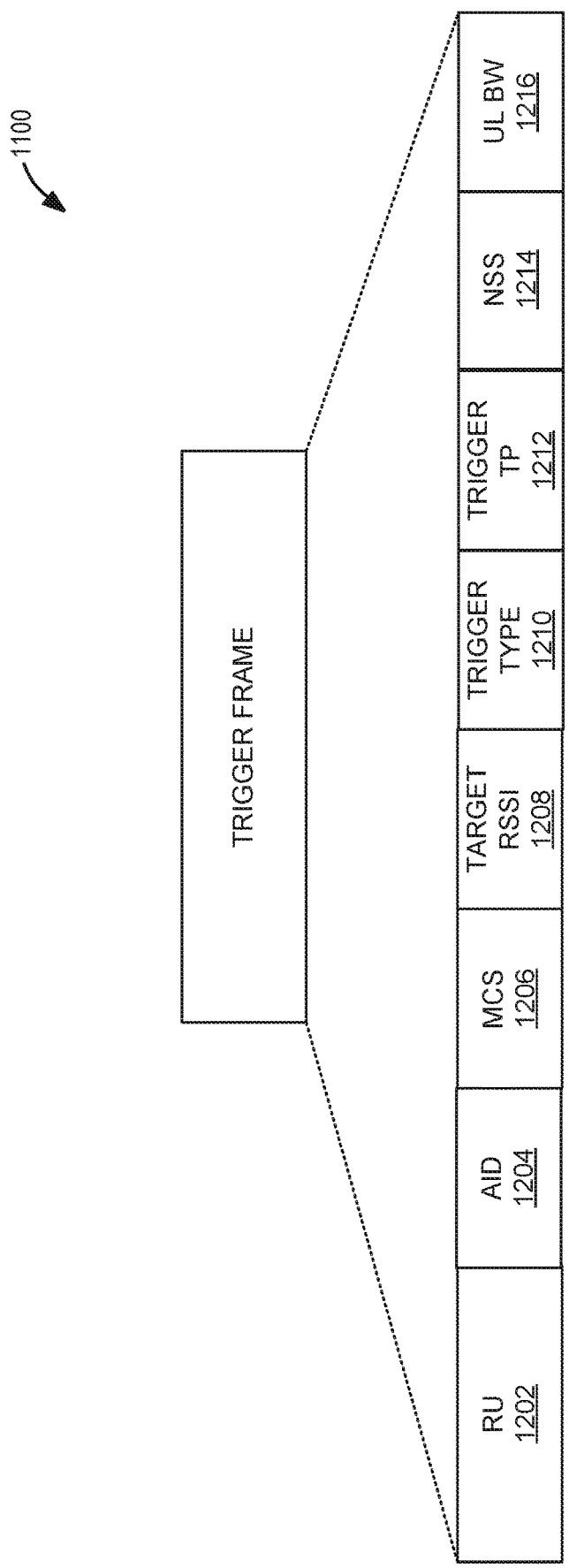
FIG. 11 illustrates a trigger frame (TF), in accordance with some embodiments.

FIG. 11 illustrates a trigger frame (TF) 1100, in accordance with some embodiments. Illustrated in FIG. 11 is TF 1100. The TF 1100 includes one or more of the following subfields, RU 1202, association identification (AID) 1204, modulation and coding scheme (MCS) 1206, target receive signal strength indicator (RSSI) 1208, trigger type 1210, trigger transmit power 1212, number of spatial streams 1214, and UL bandwidth (BW) 1216. RU 1202 is a group (e.g., 26, 52, 106, 242, 484, 996, or 2×996) of subcarriers as an allocation unit. AID 1204 is an identifier of a STA and/or AP. The AID may be a different identifier than an association identifier, e.g., a value that indicates the RU is for random access by either an associated STA or unassociated STA. The MCS 1206 indicates a MCS to use for a data portion of a response EHT/HE TB PPDU. The target RSSI 1208 indicates a target receive signal strength for the STA, e.g., received power 904. As example, the STA may use the trigger TP 1212 and the target RSSI 1208 to estimate a transmit power to use to transmit a response EHT/HE TB PPDU. Trigger type 1210 indicates a type of the TF 1100, e.g., basic, buffer status report poll, bandwidth query report poll, NDP feedback report poll, etc.

Trigger TP 1212 indicates a transmit power used by the AP to transmit the TF 1100. NSS 1214 indicates a number and position of spatial streams for the STA indicated by the AID 1204. UL BW 1216 indicates an UL BW for the transmission. Some of the subfields are repeated for each AID 1204, e.g., RU 1202, NSS 1214, etc.

FIG. 12 illustrates a method 1200 of dynamic allocation of RUs, in accordance with some embodiments. Illustrated in FIG. 12 is line 1202 and code 1204. When a STA does not respond to a TF 1100 or indicates that it no longer supports EHT/EH TB PPDUs, then the AP may perform the method 1200 to dynamically allocate the RU the STA is no longer using to another member of a group of STAs. The following are some data structures that are used by the AP, in accordance with some embodiments.

Equation (1) M=N/2, if N is even; and, (N+1)/2, if N is odd, wherein the following identifies the meaning of the letters, in accordance with some embodiments. In some embodiments, the entire channel bandwidth (e.g., UL bandwidth 1216) is divided into N equal-sized RU with an index from 1 to N. The AP triggers an UL group of N STAs with STA identification (ID), e.g., AID 1204, from 1 to N. In some embodiments, RU_n indicates the nth RU and STA_n indicates the STA with ID n, where n is 1, 2, . . . , N. M may indicate the middle RU index.

In some embodiments, the AP maintains a list of alive (responding and not indicating they are not disabled from TB HE/EHT PPDU transmissions) which may be denoted as aliveStaInfoList, where "alive" indicates that a STA supports TB HE PPDU transmissions. Each element of aliveStaInfoList includes the following information of an alive STA: sta_ID, ru_index_start, and ru_index_end, where sta_ID is the ID of the STA; and, ru_index_start and ru_index_end is a start and end index of the RU that a STA is allocated (by the AP). For example, if a STA indicated that it does not support TB HE/EHT PPDU via OMI, then the AP is configured to delete its related information from aliveStaInfoList.

In accordance with some embodiments, the AP maintains a bitmap for RU allocation for each STA. The nth element, denoted as ru_used_flag[n], indicates whether RU_n is allocated to STA. If RU_n is used/occupied by a STA, ru_used_flag[n] is set to 1. If RU_n is unoccupied/unused, then ru_used_flag[n] is set to 0. When a STA has just stopped responding, the RU9s) the STA has currently allocated will become available. The AP is configured to update the corresponding ru_used_flag(s) as 0.

Initially, the AP assumes that all the STAs can respond to a trigger frame sent by the AP and RU_n is allocated to STA_n. So, aliveStaInfoList contains N elements with the following: Equation (2): aliveStaInfoList[i].sta_ID=i; Equation (3): aliveStaInfoList[i].ru_index_start=i; and, Equation (4): aliveStaInfoList[i].ru_index_end=i, where aliveStaInfoList[i] is the ith element of aliveStaInfoList with I being from 1 to N. Additionally, ru_used_flag[n]=1 for n being 1 through N.

Turning back to the method 1200, the AP upon detecting that there is a non-responding STA or that a STA no longer supports EHT/HE TB PPDU, performs the method 1200, in accordance with some embodiments.

In line 1 and line 2, the AP deletes the information of the non-responding STAs from aliveStaInfoList and updates the ru_used_flag of the RUs that non-responding STAs have allocated as 0.

In the do-while-loop from line 3 to line 30, the AP re-allocates all the unoccupied RUs to the STAs that are still responding, in accordance with some embodiments. In some embodiments not all the unoccupied RUs are re-allocated.

In line 4 the AP copies the current aliveStaInfoList to a temporary list. So, aliveStaInfoList remains untouched during the following for-loop (line 5) and is updated to be the same as the temporary list at the end of the current iteration of the do-while-loop.

The for-loop from line 5 to line 28 checks whether a RU is unoccupied. If RU_n is unoccupied, from line 7 to line 26, the AP attempts to re-allocate it to the STA that occupies the RU on either side of RU_n. During the for-loop, tempList and ru_used_flag may be updated.

In line 7, t is the index of the RU right to RU_n or left of RU_n, depending on whether n is smaller or equal to M. E.g., if RU_n is on the left (right) side of the entire bandwidth, the AP will try to re-allocate it to the STA that occupies the RU which is on the right (left) hand side of RU_n.

In line 8, AP finds in the aliveStaInfoList for the STA that occupies RU_t. If there's an element satisfies the condition ru_index_start<=t<=ru_index_end, then the status is set to FOUND and i is set to the index of the element. If not, then the status is set to NOT_FOUND and i is invalid.

In line 9, cnt, the trial counter, is initialized as 1. The while condition in line 10 makes sure that t is within the value range and the AP has not tried to re-allocate the RU more than 2 times.

If the AP has found an alive STA that occupies RU_t (line 11), then AP re-allocates RU_n to the STA whose information is in aliveStaInfoList[i]. Lines 13-16 update the ru_index_start/end field. Line 17 updates the used flag of RU_n to 1. Then the AP exits the while-loop as line 18 indicates.

If the AP has not found an alive STA that occupies RU_t, e.g., the STA that occupied RU_t has just stopped responding to AP and its information has been deleted from the aliveStaInfoList, then AP tries to re-allocate RU_n to the STA on the other side. Line 22 updates t as the RU index of the other side. Again, the AP tries to find the STA that occupies RU_t in the aliveStaInfoList (line 23). And the trial counter increments in line 24. Then the AP goes back to line 10 to check if t and cnt meet the condition. If status is FOUND this time, then the AP re-allocates RU_n successfully. Otherwise, RU_n is not re-allocated in this iteration of do-while-loop and will be re-allocated in the following iterations.

After exiting the while-loop in line 26, the AP continues to re-allocate other unoccupied RUs. After the for-loop is done, the AP updates aliveStaInfoList as tempList, and then counts the number of ones in ru_used_flag. if the number is smaller than N, which means that there's still some unoccupied RUs, the AP will try to allocate them by entering the for-loop again as line 30 shows.

When all the unoccupied RUs have been re-allocated, based on the updated aliveStaInfoList, the AP assigns the maximum supported RU size to each alive STA in line 31. Method 1200 may be performed by an apparatus of an AP, an AP, an apparatus of a STA, and/or a STA. In some embodiments, one or more lines 1202 may be performed in a different order. In some embodiments, the method 1200 does not include one or more lines 1202. In some embodiments, the method 1200 includes one or more additional lines 1202.

Figure 13:
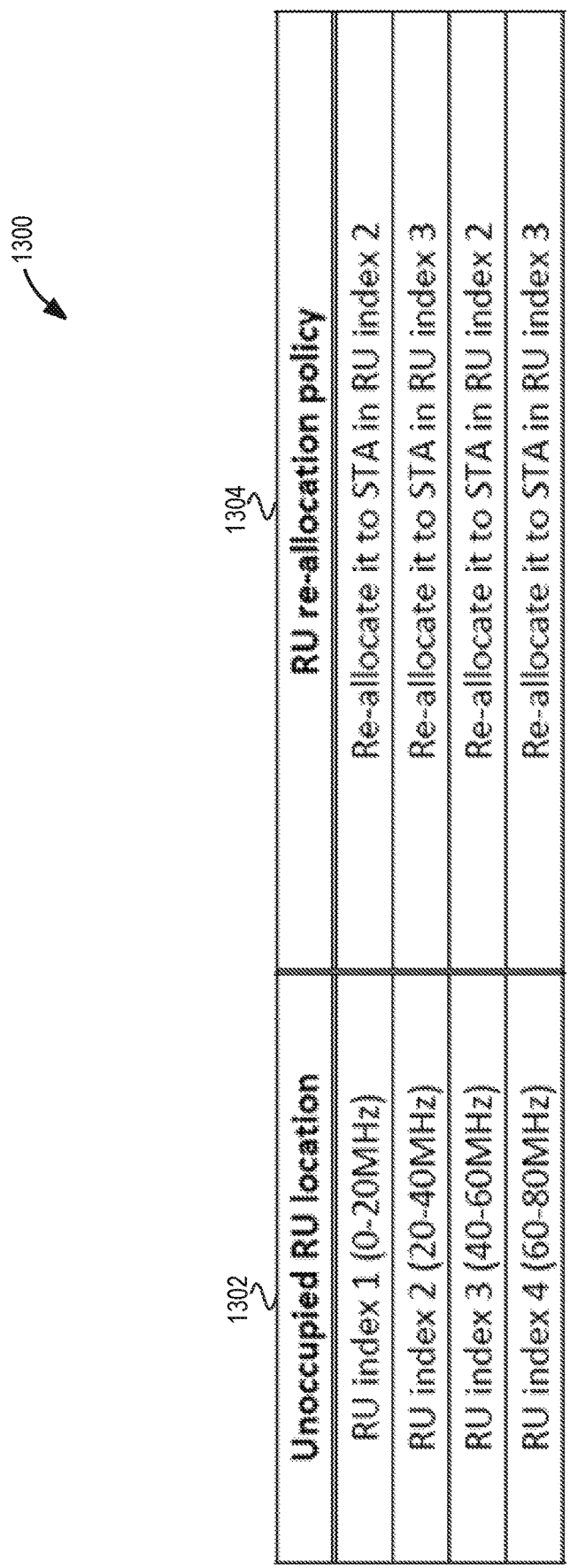
FIG. 13 illustrates a table illustrating an example of the method 1200, in accordance with some embodiments.

FIG. 13 illustrates a table 1300 illustrating an example of the method 1200, in accordance with some embodiments. Illustrated in FIG. 13 is table 1300. The table 1300 includes two columns unoccupied RU location 1302 and RU re-allocation policy 1304. The table 1300 illustrates an example of dynamic RU re-allocation for UL groups with an UL group of 4 STAs with 20 MHz RU size. In the example, only one RU become unoccupied at a time.

Figure 14:
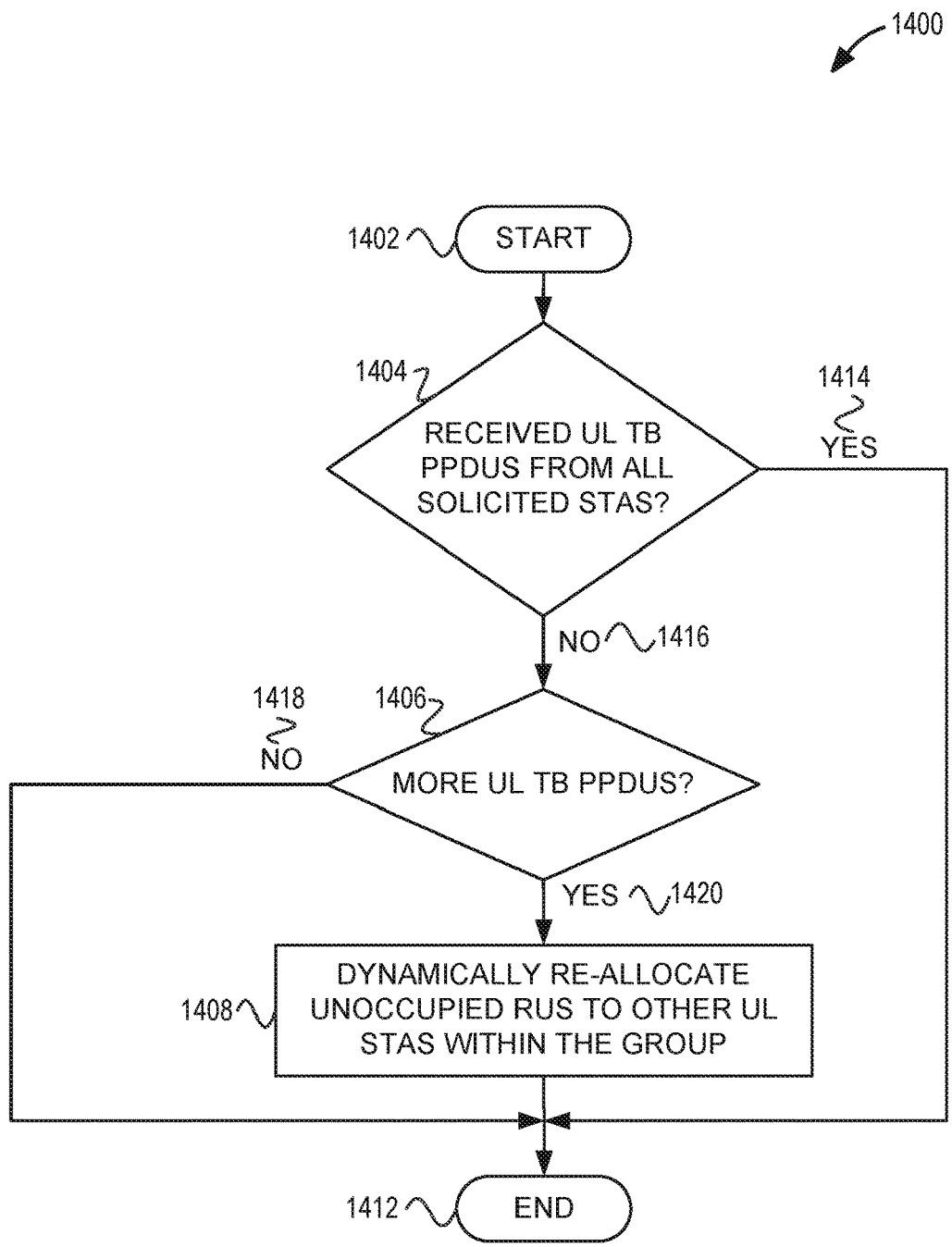
FIG. 14 illustrates a method for dynamic RU re-allocation, in accordance with some embodiments.

FIG. 14 illustrates a method 1400 for dynamic RU re-allocation, in accordance with some embodiments. The method 1400 begins at operation 1402 with start. For example, an AP may have transmitted a TF 1100, as illustrated in FIG. 10 TF 1012. The AP may have formed the UL group consisting of a group of STAs, e.g., STA A, STA B, STA C, STA D, and STA E.

The method 1400 continues at operation 1404 with did AP receive UL TB PPDUs from all solicited STAs 1404. For example, the AP may determine whether all the members of the UL group transmitted a UL TB PPDU. For example, in FIG. 10, the AP may determine if all the members of the UL group solicited responded to a TF 1012. After TF 1012.1, all the STAs responded with a UL TB PPDU, i.e., STA A→AP 1014.1, STA B→AP 1016.1, STA C→AP 1018.1, STA D→AP 1020.1, and STA E→AP 1022.1. In this case yes 1414 is the answer and the method 1400 continues with operation 1412 end.

After TF 1012.3, all the STAs did not respond with a UL TB PPDU, i.e., STA A→AP 1014.3, no trans 1024.1, STA C→AP 1018.3, STA D→AP 1020.3, and STA E→AP 1022.3. STA B did not respond. In this case, the answer is no 1416 and the method 1400 continues at operation 1406 more UL TB PPDUs. For example, the AP determines whether there are more UL TB PPDU to be solicited from the UL group and whether to transmit another TF to the UL group. The AP may have information regarding the UL needs of the STAs based on previous queries as disclosed herein.

When the answer is no 1418, the method 1400 continues at operation 1412 with end. When the answer is yes 1420, then the AP dynamically re-allocates unoccupied RUs to other UL STAs within the group. For example, the AP may perform the method 1200. In another example, table 1300 at row 1 illustrates an example when an RU with index 1 is unoccupied because a STA did not transmit an UL TB PPDU. In this case the AP re-allocates the RU index 1 to STA in RU with an index 2. The method 1400 may continue at operation 1412. After re-allocating unoccupied RUs to other UL STAs within the group, the AP will encode and transmit another TF, in accordance with some embodiments.

The method 1400 may be performed by an EHT/HE AP, e.g., EHT AP 502, and/or by an apparatus of an EHT/HE AP. The operations of method 1400 may be performed in a different order, in accordance with some embodiments. The method 1400 may include one or more additional operations in accordance with some embodiments. One or more of the operations of method 1400 may be optional, in accordance with some embodiments.

Figure 15:
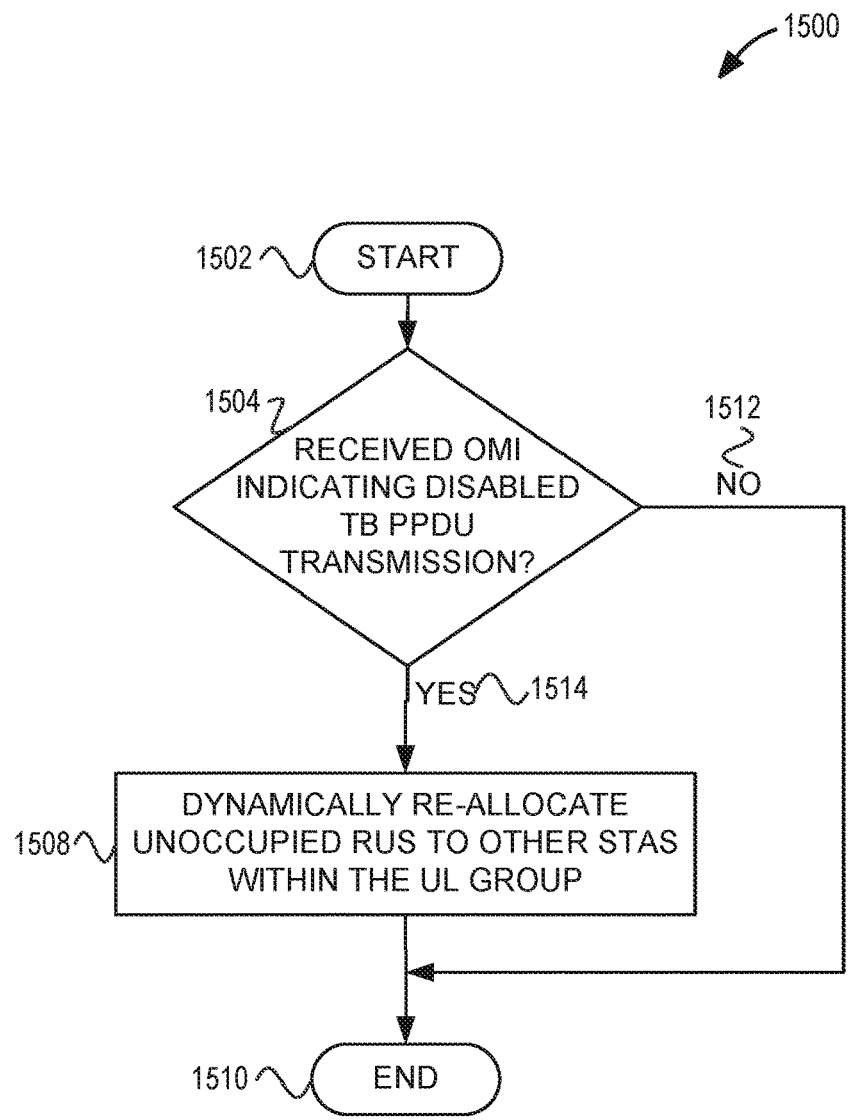
FIG. 15 illustrates a method for dynamic RU re-allocation, in accordance with some embodiments.

FIG. 15 illustrates a method 1500 for dynamic RU re-allocation, in accordance with some embodiments. The method 1500 begins at operation 1502 with start. For example, an AP may have transmitted a TF 1100, as illustrated in FIG. 10 TF 1012. The AP may have formed the UL group consisting of a group of STAs, e.g., STA A, STA B, STA C, STA D, and STA E. Prior to performing the method 1500, the AP may determine to transmit another TF.

The method 1500 continues at operation 1504 with received OMI indicating disabled TB PPDU transmission. For example, as disclosed herein a STA of the UL group may indicate that TB PPDU transmissions are disabled, e.g., in an element. If a STA has not disabled TB PPDU transmissions, then the method 1500 continues at operation 1510 with end. For example, the AP may encode another TF with the current UL group of STAs. If a STA has disabled TB PPDU transmission (yes 1514), then the method 1500 continues at operation 1508 dynamically re-allocate unoccupied RUs to other STAs within the UL group. For example, the AP may perform the method 1200. In another example, table 1300 at row 1 illustrates an example when an RU with index 1 is unoccupied because a STA did not transmit an UL TB PPDU. In this case the AP re-allocates the RU index 1 to STA in RU with an index 2. The method 1500 continues to operation 1510 with end. The AP will encode a TF based on the re-allocation.

The method 1500 may be performed by an EHT/HE AP, e.g., EHT AP 502, and/or by an apparatus of an EHT/HE AP. The operations of method 1500 may be performed in a different order, in accordance with some embodiments. The method 1500 may include one or more additional operations in accordance with some embodiments. One or more of the operations of method 1500 may be optional, in accordance with some embodiments.

FIGS. 16-20 illustrate an example of dynamic RU allocation, in accordance with some embodiments. FIGS. 16-20 illustrate an example of an AP or apparatus of an AP performing a method of dynamic RU allocation. In some embodiments, FIGS. 16-20 illustrate the method 1200 being performed by an apparatus of an AP or an AP. The UL group of STAs consists of eight (8) STAs and each STA occupies a 10 MHz RU initially. The RU sizes are 10 MHz, 20 MHz, 40 MHz, and 80 MHz, although different RU sizes may be used.

Figure 16:
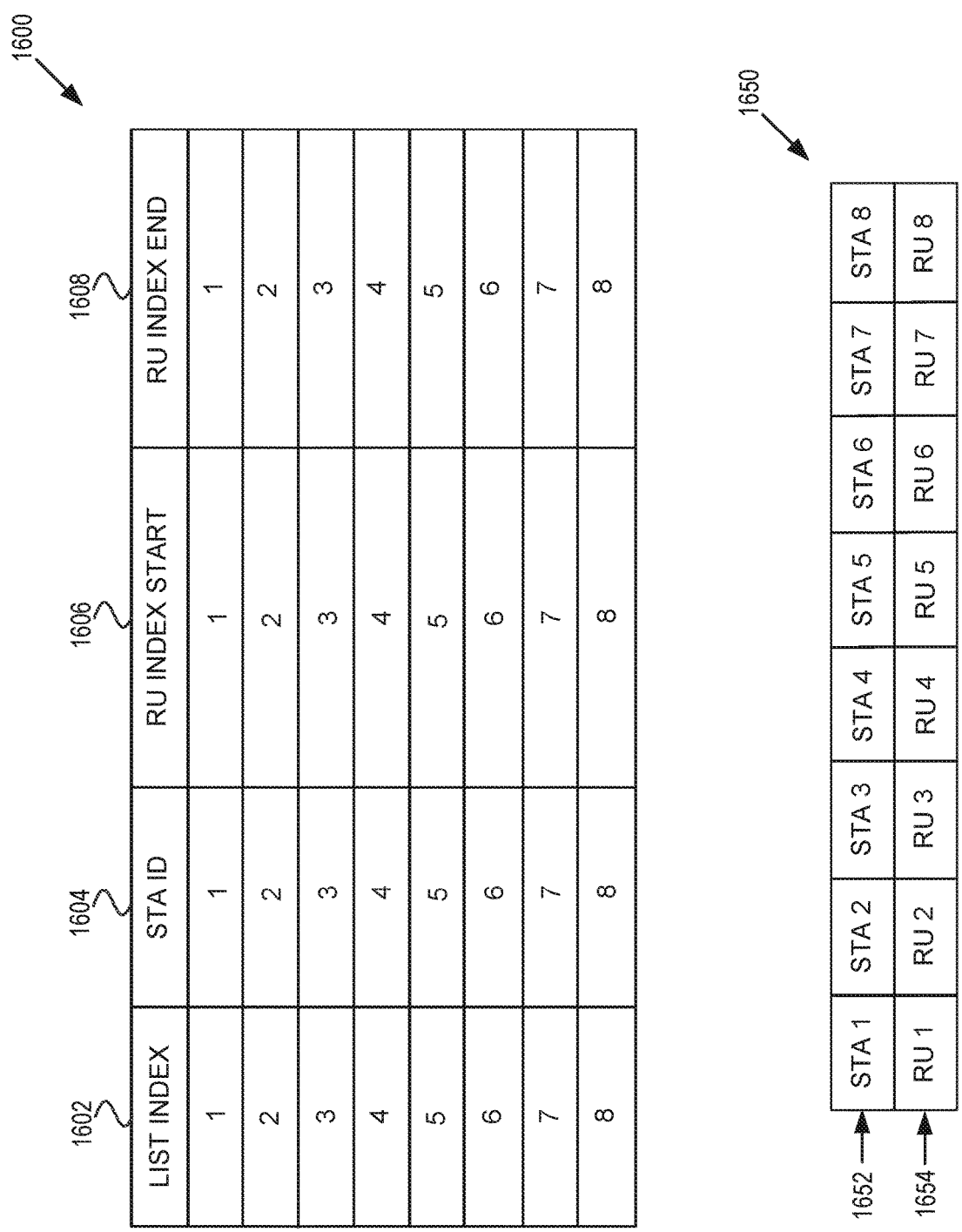
FIGS. 16-20 illustrate an example of dynamic RU allocation, in accordance with some embodiments.

Illustrated in FIGS. 16-20 aliveStaInfoList 1600, 1700, 1800, 1900, 2000, and ru_used_flag 1650, 1750, 1850, 1950, 2050. FIG. 16 illustrates an initial state of aliveStaInfoList and ru_used_flag. The RUs of ru_used_flag are represent the physical placement of the RU in the frequency spectrum, e.g., RU 3 is between in frequency range RU 2 and RU 4. In the initial state all STA are assumed to have responded to the TF and available (e.g., not indicated they no longer support UL TB PPDUs). Illustrated in FIGS. 16-20 are the following columns of aliveStaInfoList 1600, 1700, 1800, 1900, 2000, list index 1602, 1702, 1802, 1902, 2002, STA ID 1604, 1704, 1804, 1904, 2004, RU index start 1606, 1706, 1806, 1906, 2006, and RU index end 1608, 1708, 1808, 1908, 2008, respectively. Illustrated in FIGS. 16-20 are the following rows of ru_used_flag 1650, 1750, 1850, 1950, 2050, STA ID 1652, 1752, 1852, 1952, 2052, and RU ID 1654, 1754, 1854, 1954, 2054, respectively. The initial state illustrated in FIG. 16 may be at the start, e.g., before TF 1012.1 is transmitted, or after a TF 1012.2 is transmitted and all the STAs respond. Additionally, the assignment of the STAs to the RUs may have been after the AP had exchanged PPDUs or packets with the STAs to determine interferences and the AP may have selected the RUs to reduce or minimize interference among the STAs.

Figure 17:
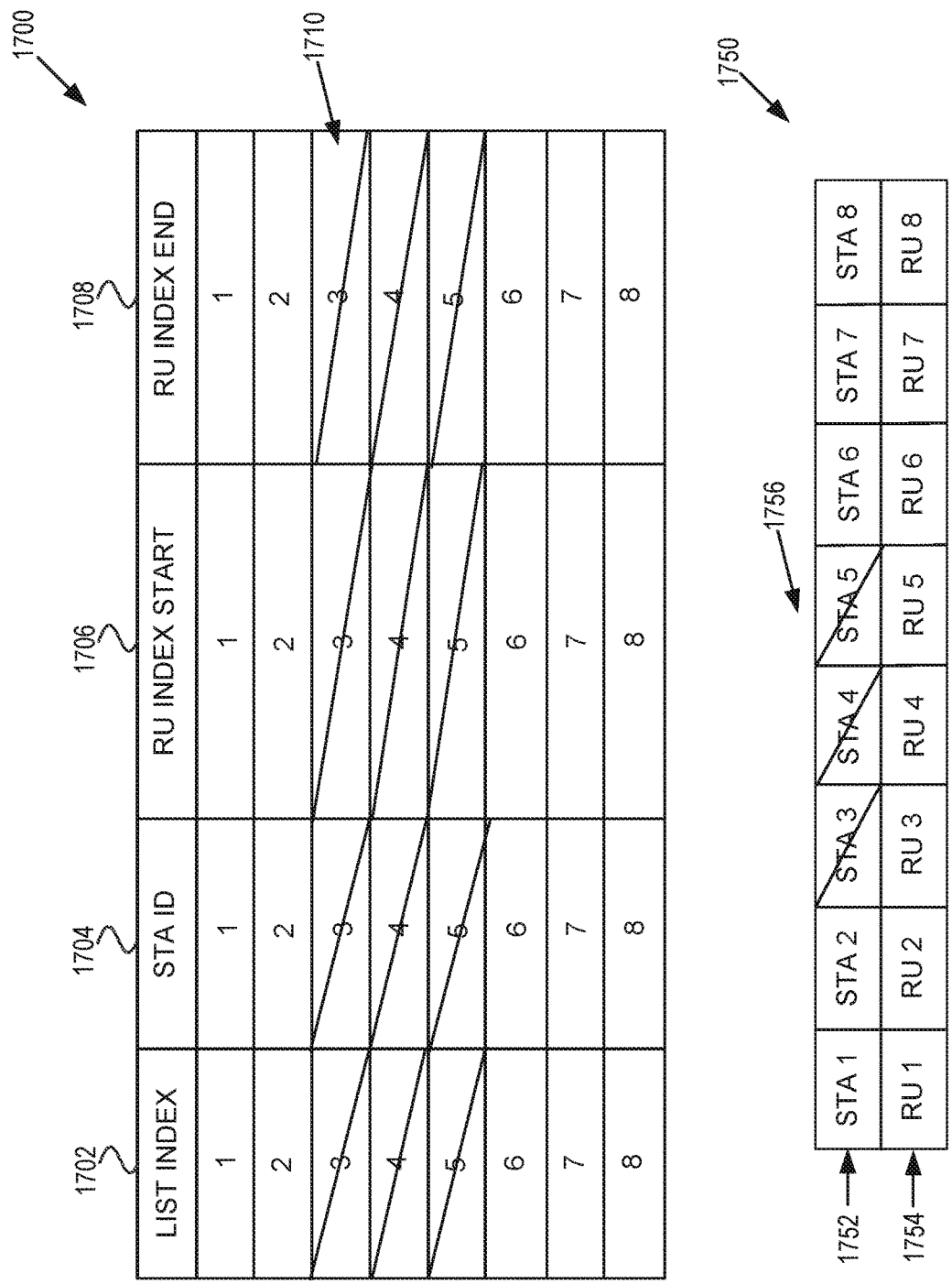

FIG. 17 illustrates a state after a TF has been transmitted and STAs 3, 4, and 5 have stopped responding (or indicated to the AP that they do not support HE/EHT TB PPDUs). AliveStaInfoL 1700 is and ru_used_flag 1750 are updated. At 1710, the information for STAs 3, 4, 5 (list index 1702 of 3, 4, 5) has been updated as not valid or STA not responding. Additionally, at 1756 the information for STA 3, STA 4, and STA 5 has been indicated as not valid or STA not responding a 0 as not occupied).

Figure 18:
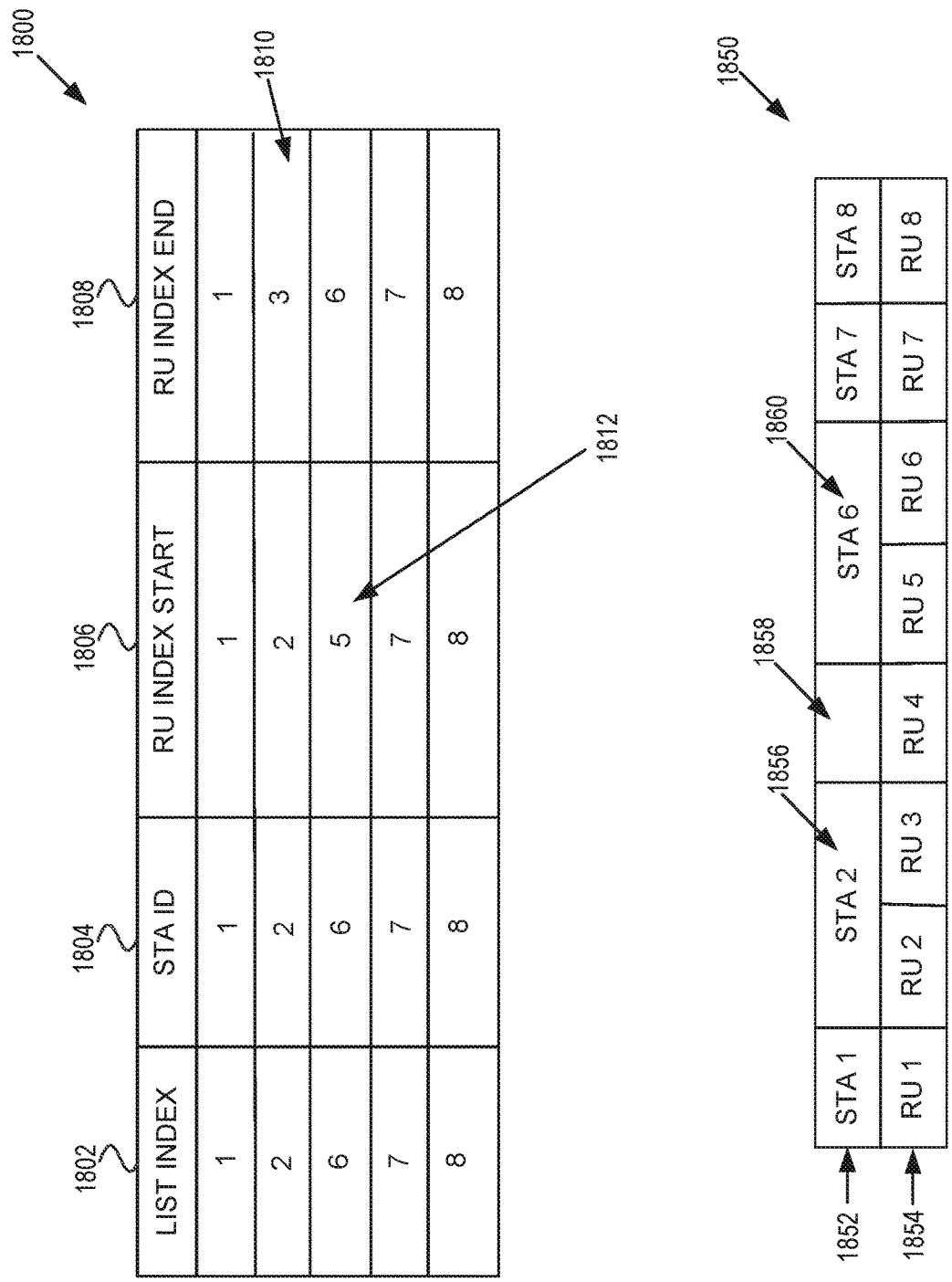

FIG. 18 illustrates a state after a first iteration of the do-while-loop (lines 3 to 30) of the method 1200. In the first iteration of the do-while-loop, the AP fails to allocate RU_3 to STA 4 because STA 4 is not responding any longer, so the AP at 1856 eventually re-allocates RU 3 to STA 2. Additionally, in the first iteration of the do-while-loop, the AP fails to allocate RU_5 to STA 4 because STA 4 is not responding any longer, so the AP at 1860 eventually re-allocates RU 5 to STA 6. But when the AP is trying to re-allocate RU_4, the AP finds that the STAs on both sides (both STA 3 and STA 5) are not responding. As a result, the AP at 1858 leaves RU_4 unoccupied at the end of this iteration of the do-while-loop. AliveStaInfoList 1800 is updated in accordance with the above where RU index start 1806 of STA 6 is changed to 5 at 1812, and RU index end 1808 of STA 2 is changed to 3 at 1810.

Figure 19:
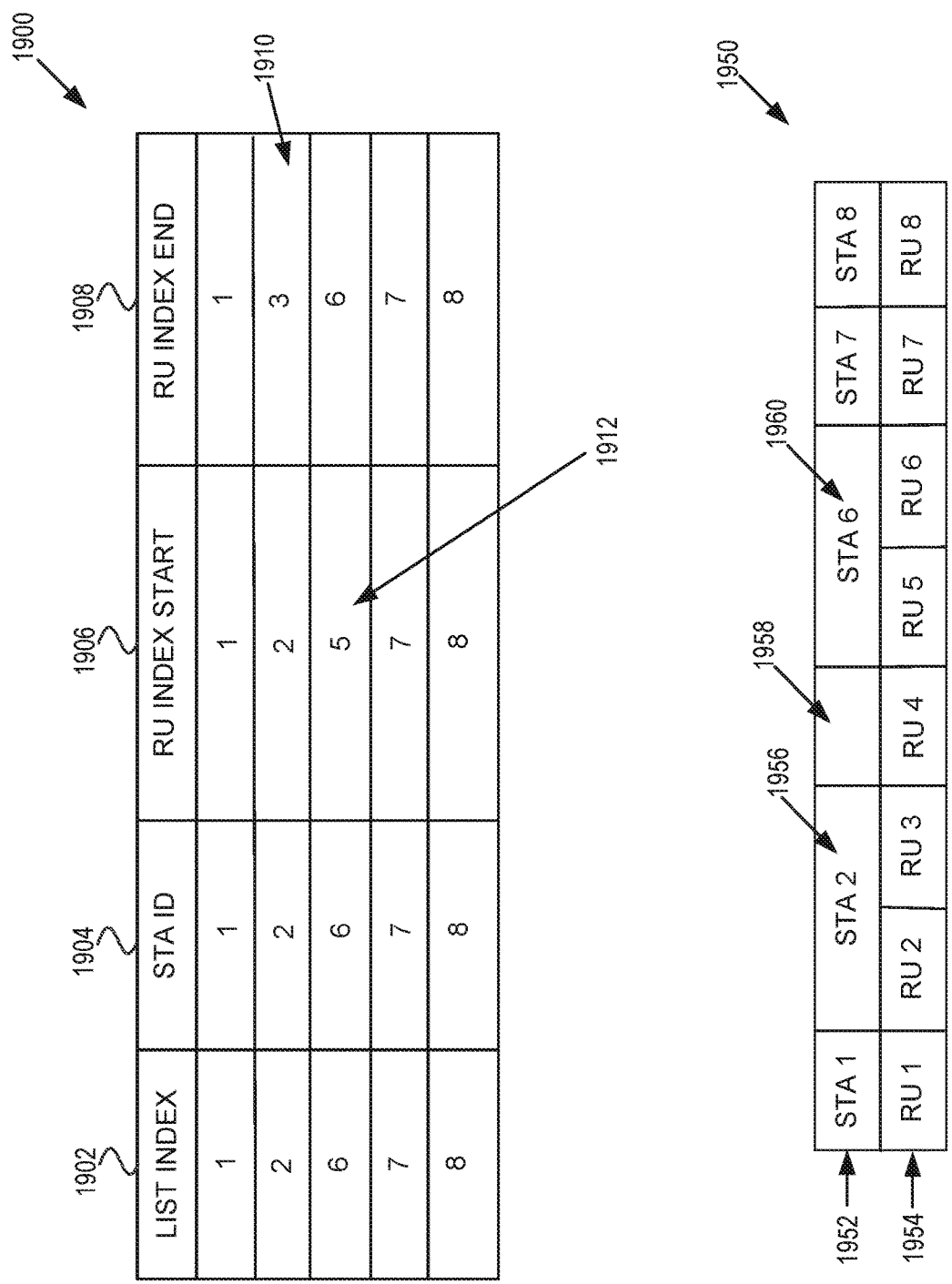

FIG. 19 illustrates aliveStaInfoList 1900 and ru_used_flag 1950 after the first iteration of the do-while-loop (lines 3-30 of FIG. 12). RU 4 is still unoccupied at 1958. STA 2 now occupies RU 3 at 1956 and STA 6 now occupies RU 5 at 1960. The RU index start 1906 of STA 6 is changed to 5 at 1912 and the RU index end 1908 of STA 2 is changed to 3 at 1910.

Figure 20:
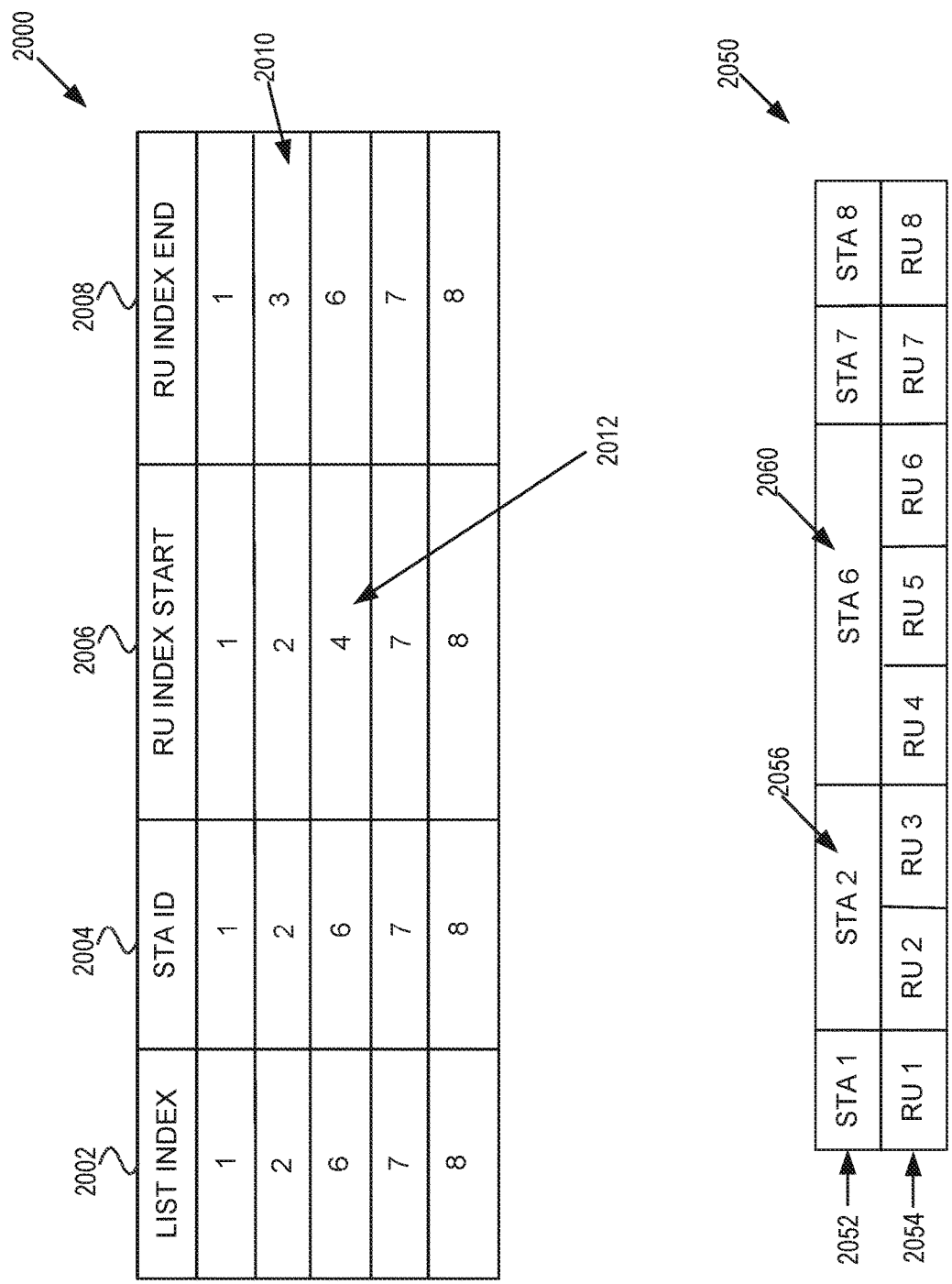

Since RU 4 is still unoccupied at 1958, the AP enters a second iteration of the do-while-loop to try and re-allocate RU 4 again. Since the aliveStaInfoList 1900 has been updated at the end of the first iteration of the do-while-loop, this time at 2060 (FIG. 20) the AP finds that RU 5 indicates STA 6 occupies RU 5 and is alive. So, at the end of the second iteration of the do-while-loop, RU 4 is reallocated to STA 6 as illustrated in FIG. 20. Up to now, all the RUs are occupied. The method 1200 may end in accordance with some embodiments. Note that STA 6 is allocated with 3 RUs and the bandwidth is 30 MHz which may not be supported, in accordance with some embodiments. Therefore, the maximum available 20 MHz will be utilized in practice, in some embodiments. In some embodiments, the updating is performed only to extend RUs for a STA that can be allocated by a TF to a STA.

Figure 21:
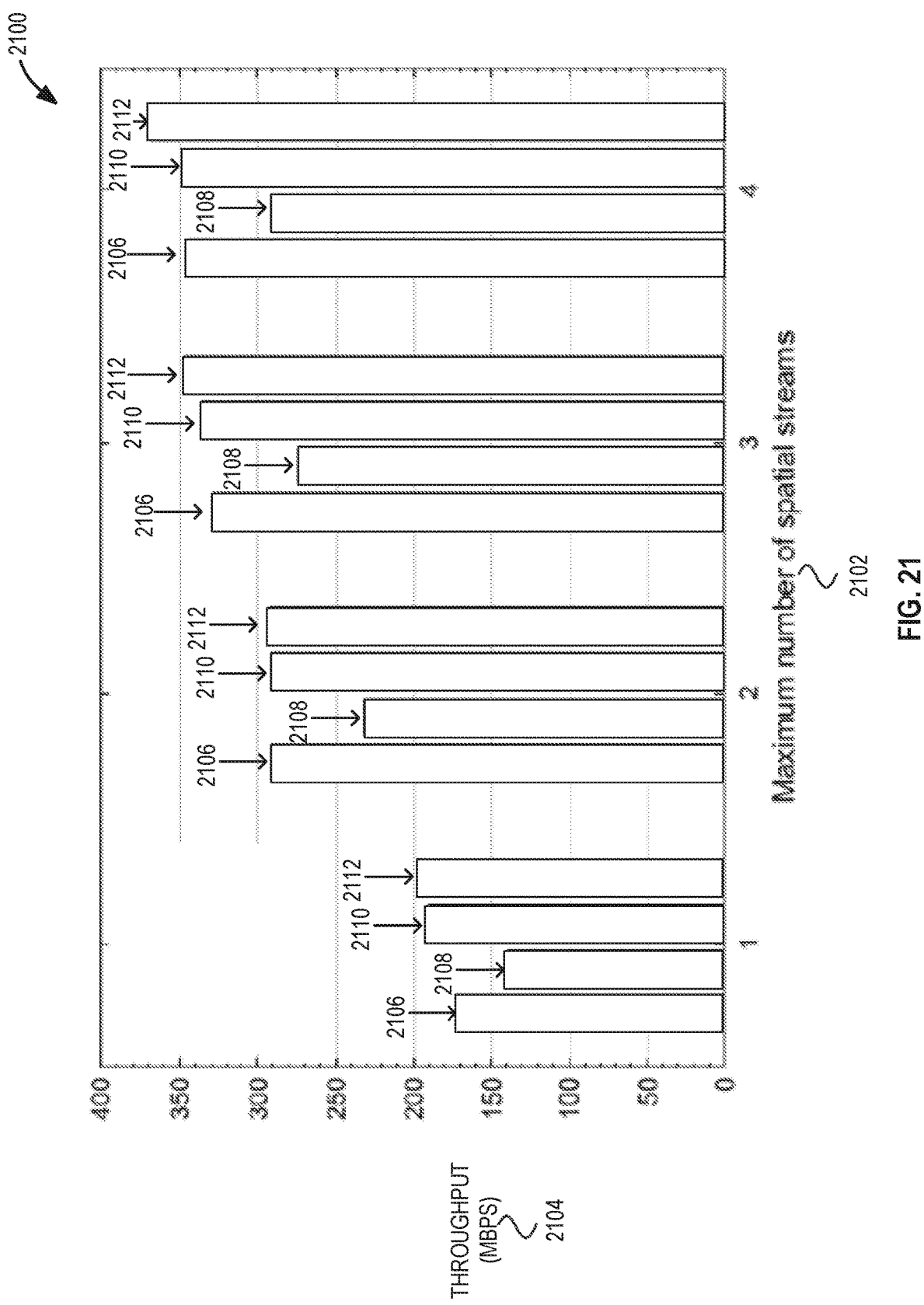
FIGS. 21 and 22 illustrate simulation results for dynamic RU re-allocation, in accordance with some embodiments.
Figure 22:
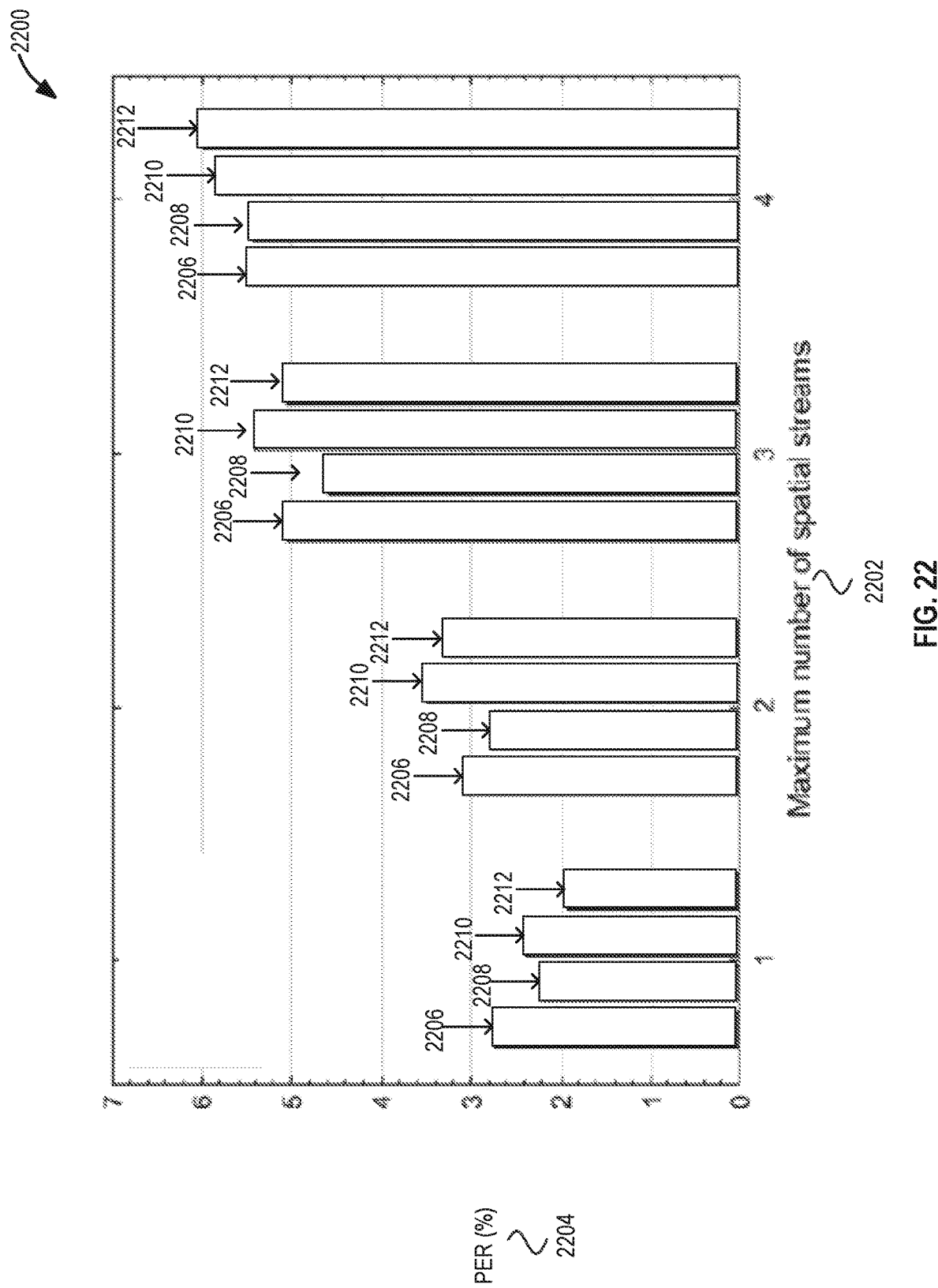

FIGS. 21 and 22 illustrate simulation results 2100, 2200 for dynamic RU re-allocation, in accordance with some embodiments. Illustrated in FIG. 21 is maximum number of spatial stream 2102, throughput (MBPS) 2104, baseline 2106, case 1-1 2108, case 1-2 2110, and case 1-3 2112. Illustrated in FIG. 22 is maximum number of spatial stream 2202, packet error rate (percentage %) 2204, baseline 2206, case 1-1 2208, case 1-2 2210, and case 1-3 2212.

The simulation results 2100, 2220 are for an AP that triggers an UL group of 4 UL STAs and each UL STA is allocated a single 20 MHz RU and one of the UL STAs may not respond to the trigger frame. The simulation results test the case where one of the solicited UL STAs in the middle (e.g., an RU of 20-60 MHz within a 80 MHz channel bandwidth) does not respond to the trigger frame.

The baseline case 2106, 2206 is (20-20-20-20 MHz channels): where all of the solicited UL STAs respond to AP's trigger frame. Case 1-1 2108, 2208 (20-20-0-20) is where the AP does not re-allocate the unoccupied RU resource. Case 1-2 2110, 2210 (20-20-40) is where the AP re-allocates the unoccupied RU to the STA at the edge of the 80 MHz bandwidth. Case 1-3 2112, 2212 (20-40-20) is where the AP re-allocates the unoccupied RU to the STA in the middle of the 80 MHz bandwidth.

The simulation results 2100, 2200 indicate that better results are obtain by re-allocating unoccupied. RUs to other UL STAs in the UL group rather than not allocate the resource. For example, Cases 1-2 2110, 2210 and 1-3 2112, 2212 achieve higher throughput performance than Case 1-1 2108, 2208 in all of the tested scenarios, as shown in FIGS. 21 and 22.

Simulation results show that the throughput performance can be improved or maximized when the AP re-allocates the unoccupied RU to a neighboring STA with RU allocation in the middle of the channel bandwidth (i.e., Case 1-3 2112, 2212) instead of allocating the RU to a neighboring STA at the edge of the channel bandwidth (i.e., Case 1-2 2110, 2210). By allocating a wider RU (i.e., 40 MHz) in the middle of the channel bandwidth, the AP can separate other STAs with a narrower RUs (i.e., STAs w/RU locations at 0-20 MHz and 60-80 MHz) and hence reduce or minimize the amount of MUI among the STAs.

Case 1-3 2112, 2212 also achieves lower (or similar) PER 2204 performance as Case 1-2 2110, 2210. Based on simulation results 2100, 2200, the AP can increase the throughput performance by dynamically re-allocating unoccupied RUs to other UL STAs within the group. Throughput performance can be further improved or optimized by allocating such unoccupied RUs to STAs w/RUs allocated in the middle of the channel bandwidth, especially when the RU size is relatively large compared to the entire channel bandwidth.

Figure 23:
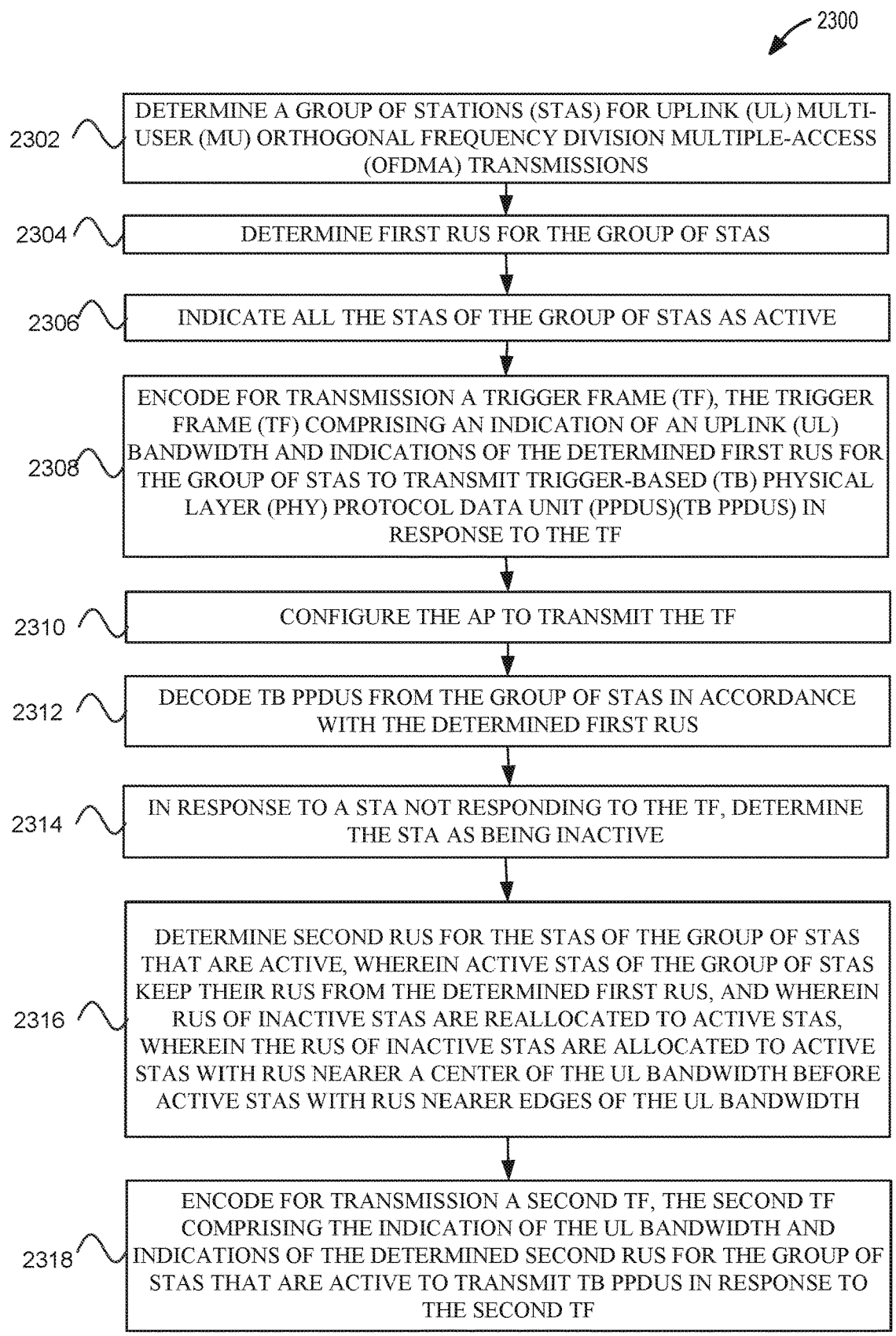
FIG. 23 illustrates a method of dynamic allocation of RUs, in accordance with some embodiments.

FIG. 23 illustrates a method 2300 of dynamic allocation of RUs, in accordance with some embodiments. The method 2300 begins at operation 2302 with determining a group of STAs for UL MU OFDMA transmissions. For example, AP 806 may determine the group STA A-STA E 804.1-804.5. In another example, an AP may determine the four STAs of table 1300. In another example, an AP may determine the eight STAs of the example of FIGS. 16-20.

The method 2300 may continue at operation 2304 with determining first RUs for the group of STAs. For example, AP 806 may determine the group RUs of FIG. 10. In another example, an AP may determine the four RUs of table 1300. In another example, an AP may determine the eight RUs of the example of FIGS. 16-20.

The method 2300 continues at operation 2306 with indicating all the STAs of the group of STAs as active. For example, referring to method 1200 an example of FIGS. 16-20, an AP may set aliveStaInfoList to indicate that all the STAs are alive or active.

The method 2300 continues at operation 2308 encoding for transmission a TF, the TF including an indication of an UL bandwidth and indications of the determined first RUs for the group of STAs to transmit TB PPDUs in response to the TF. For example, AP 806 may encode TF 1012.1, 2. An AP may encode a TF prior to the performance of method 1200 and prior to the perform of the example of FIGS. 16-20.

The method 2300 continues at operation 2310 with configuring the AP to transmit the TF. For example, an apparatus of an AP, e.g., AP 806 or EHT AP 502, may configure the AP to transmit a TF.

The method 2300 continues at operation 2312 with decoding TB PPDUs from the group of STAs in accordance with the determined first RUs. For example, an AP performing the method 1200 may decode TB PPDUs before performing the method 1200. In another example, AP 1002 may decode the TB PPDUs STA A→AP 1014, STA B→AP 1016, STA C→AP 1018, STA D→AP 1020, and STA E→AP 1022.

The method 2300 may continue with operation 2314 with in response to a STA not responding to the TF, determine the STA as being inactive. For example, an AP performing the method 1200 may determine which STAs are not alive or inactive as describe in conjunction with FIG. 17.

The method 2300 may continue with operation 2316 with determining second RUs for the STAs of the group of STAs that are active, where active STAs of the group of STAs keep their RUs from the determined first RUs, and wherein RUs of inactive STAs are reallocated to active STAs, where the RUs of inactive STAs are allocated to active STAs with RUs nearer a center of the UL bandwidth before active STAs with RUs nearer edges of the UL bandwidth. For example, an apparatus of an AP or an AP performing the method 1200 may reallocate RUs used by inactive STAs of the group of STAs to active STAs of the group of STAs, e.g., as disclosed in conjunction with FIGS. 18-20.

The method 2300 continues at operation 2318 with encoding for transmission a second TF, the second TF comprising the indication of the UL bandwidth and indications of the determined second RUs for the group of STAs that are active to transmit TB PPDUs in response to the second TF. For example, an apparatus of an AP or an AP may encode a second. TF with the RU assignments of FIG. 20, as disclosed in conjunction with FIG. 20.

Method 2300 may be performed by a HE AP, EHT AP, an apparatus of an HE AP, and/or an apparatus of an EHT AP, in accordance with some embodiments. Operations of method 2300 may be performed in a different order. One or more of the operations of method 2300 may be optional. Method 2300 may include one or more additional operations.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising memory; and processing circuitry coupled to the memory, the processing circuitry configured to:
    determine a group of stations (STAs) for uplink (UL) multi-user (MU) orthogonal frequency division multiple-access (OFDMA) transmissions;
    determine first RUs for the group of STAs;
    indicate all the STAs of the group of STAs as active;
    encode for transmission a trigger frame (TF), the trigger frame (TF) comprising an indication of an uplink (UL) bandwidth and indications of the determined first RUs for the group of STAs to transmit trigger-based (TB) physical layer (PHY) protocol data unit (PPDUs)(TB PPDUs) in response to the TF;
    configure the AP to transmit the TF;
    decode TB PPDUs from the group of STAs in accordance with the determined first RUs;
    in response to a STA not responding to the TV, determine the STA as being inactive;
    determine second RUs for the STAs of the group of STAs that are active, wherein active STAs of the group of STAs keep their RUs from the determined first RUs, and wherein RUs of inactive STAs are reallocated to active STAs, wherein the RUs of inactive STAs are allocated to active STAs with RUs nearer a center of the UL bandwidth before active STAs with RUs nearer edges of the UL bandwidth; and
    encode for transmission a second TF, the second TF comprising the indication of the UL bandwidth and indications of the determined second RUs for the group of STAs that are active to transmit TB PPDUs in response to the second TF.

2. The apparatus of claim 1, wherein the processing circuitry is further configured to:
    in response to a STA responding to the TF with an indication that the STA no longer support TB PPDUs, determine the STA as being inactive.

3. The apparatus of claim 1, wherein the processing circuitry is further configured to:
    determine first RUs for the group of STAs based on reducing interference among the STAs of the group of STAs.

4. The apparatus of claim 1, wherein the second TF refrains from including STAs that are not part of the group of STAs.

5. The apparatus of claim 1, wherein the UL bandwidth is one of the following group: 20 MHz, 40 MHz, 80 MHz, 160 MHz, 80+80 MHz, 80 MHz+160 MHz, 320 MHz, 160+160 MHz, and wherein an RU of the RU is one of the following group: 26-tone, 52-tone, 106-tone, 242-tone, 484-tone, 996-ton, and 2x996 tone.

6. The apparatus of claim 1, wherein the processing circuitry is further configured to:
    in response to a RU of an inactive STA being reallocated to an active STA, determine a new RU for the active STA as being a combination of the RU of the inactive STA plus the RU active STA.

7. The apparatus of claim 1, wherein the processing circuitry is further configured to:
    exchange frames with the STAs, the STAs including the group of STAs and additional STAs;
    determine interference characteristics of the STAs based on the exchanged frames; and
    determine the group of STAs based on the interference characteristics, wherein the group of STAs are selected to reduce interference among the group of STA.

8. The apparatus of claim 1, wherein the processing circuitry is further configured to:
    configure the AP to transmit the second TF;
    decode TB PPDUs from the group of STAs that are active in accordance with the determined second RUs; and
    in response to a STA not responding to the TF, determine the STA as being inactive.

9. The apparatus of claim 1, wherein an RUs of inactive STAs are not reallocated to active STAs when a combination of a corresponding RU of an inactive STA and a corresponding RU of an active STA are not combinable to form a new RU.

10. The apparatus of claim 9, wherein the corresponding RU of the inactive STA and the corresponding RU of the active STA are not combinable to form the new RU when the frequency range of the corresponding RU of the inactive STA combined with the corresponding RU of the active STA is not a selectable RU for the UL bandwidth.

11. The apparatus of claim 1, wherein the first TF and the second TF further comprise: an identification (ID) subfield, a modulation and coding scheme (MCS) subfield, a received signal strength indication (RSSI) subfield, a trigger type subfield, a transmit power (TP) subfield, and a spatial stream subfield.

12. The apparatus of claim 1, wherein the AP and the STAs are configured to operate in accordance with one or more of: Institute of Electrical and Electronic Engineering (IEEE) 802.11 HE, IEEE 802.11 EHT, and IEEE 802.11.

13. The apparatus of claim 2 further comprising: mixer circuitry to downconvert RF signals to baseband signals; and synthesizer circuitry, synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the TB PPDUs.

14. The apparatus of claim 2 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the TB PPDUs.

15. A method performed by an apparatus of an access point (AP), the method comprising:
   determining a group of stations (STAs) for uplink (UL) multi-user (MU) orthogonal frequency division multiple-access (OFDMA) transmissions;
   determining first RUs for the group of STAs;
   indicating all the STAs of the group of STAs as active;
   encoding for transmission a trigger frame (TF), the trigger frame (TF) comprising an indication of an uplink (UL) bandwidth and indications of the determined first RUs for the group of STAs to transmit trigger-based (TB) physical layer (PHY) protocol data unit (PPDUs)(TB PPDUs) in response to the TF;
   configuring the AP to transmit the TF;
   decoding TB PPDUs from the group of STAs in accordance with the determined first RUs;
   in response to a STA not responding to the TF, determining the STA as being inactive;
   determining second RUs for the STAs of the group of STAs that are active, wherein active STAs of the group of STAs keep their RUs from the determined first RUs, and wherein RUs of inactive STAs are reallocated to active STAs, wherein the RUs of inactive STAs are allocated to active STAs with RUs nearer a center of the UL bandwidth before active STAs with RUs nearer edges of the UL bandwidth; and
   encoding for transmission a second TF, the second TF comprising the indication of the UL bandwidth and indications of the determined second RUs for the group of STAs that are active to transmit TB PPDUs in response to the second TF.

16. The method of claim 15, further comprising:
   in response to a STA responding to the TF with an indication that the STA no longer support TB PPDUs, determining the STA as being inactive.

17. A non-transitory computer-readable storage medium that stores instructions for execution by one or more processors of an apparatus of an access point (AP), the instructions to configure the one or more processors to:
   determine a group of stations (STAs) for uplink (UL) multi-user (MU) orthogonal frequency division multiple-access (OFDMA) transmissions;
   determine first RUs for the group of STAs;
   indicate all the STAs of the group of STAs as active;
   encode for transmission a trigger frame (TF), the trigger frame (TF) comprising an indication of an uplink (UL) bandwidth and indications of the determined first RUs for the group of STAs to transmit trigger-based (TB) physical layer (PHY) protocol data unit (PPDUs)(TB PPDUs) in response to the TF;
   configure the AP to transmit the TF;
   decode TB PPDUs from the group of STAs in accordance with the determined first RUs;
   in response to a STA not responding to the TF, determine the STA as being inactive;
   determine second RUs for the STAs of the group of STAs that are active, wherein active STAs of the group of STAs keep their RUs from the determined first RUs, and wherein RUs of inactive STAs are reallocated to active STAs, wherein the RUs of inactive STAs are allocated to active STAs with RUs nearer a center of the UL bandwidth before active STAs with RUs nearer edges of the UL bandwidth; and
   encode for transmission a second TF, the second TF comprising the indication of the UL bandwidth and indications of the determined second RUs for the group of STAs that are active to transmit TB PPDUs in response to the second TF.

18. The non-transitory computer-readable storage medium of claim 17, wherein the instructions further configure the one or more processors to:
   in response to a STA responding to the TF with an indication that the STA no longer support TB PPDUs, determine the STA as being inactive.

19. The non-transitory computer-readable storage medium of claim 17, wherein the instructions further configure the one or more processors to:
   determine first RUs for the group of STAs based on reducing interference among the STAs of the group of STAs.

20. The non-transitory computer-readable storage medium of claim 17, wherein the second TF refrains from including STAs that are not part of the group of STAs.

* * * * *